United States Patent
Allen et al.

(10) Patent No.: US 8,201,320 B2
(45) Date of Patent: Jun. 19, 2012

(54) METHOD FOR MANUFACTURING A MAGNETIC WRITE HEAD HAVING A WRAP AROUND SHIELD THAT IS MAGNETICALLY COUPLED WITH A LEADING MAGNETIC SHIELD

(75) Inventors: Donald G. Allen, Morgan Hill, CA (US); Yingjian Chen, Fremont, CA (US); Andrew Chiu, San Jose, CA (US); Liubo Hong, San Jose, CA (US); Wen-Chien D. Hsiao, San Jose, CA (US); Edward H. P. Lee, San Jose, CA (US); Fenglin Liu, Milpitas, CA (US); Katalin Pentek, San Jose, CA (US); Kyusik Shin, Pleasanton, CA (US); Yi Zheng, San Ramon, CA (US); Qiping Zhong, San Jose, CA (US); Honglin Zhu, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 287 days.

(21) Appl. No.: 12/641,242

(22) Filed: Dec. 17, 2009

(65) Prior Publication Data

US 2011/0146062 A1 Jun. 23, 2011

(51) Int. Cl.
*H04R 31/00* (2006.01)
*G11B 5/127* (2006.01)

(52) U.S. Cl. ............... 29/603.16; 29/603.11; 29/603.13; 29/603.14; 29/603.15; 29/603.18; 216/22; 216/39; 216/41; 216/48; 216/65; 360/121; 360/122; 360/317; 451/5; 451/41

(58) Field of Classification Search ............... 29/603.11, 29/603.13–603.16, 603.18; 216/22, 39, 41, 216/48, 65; 360/121, 122, 317; 451/5, 41; 427/127, 128
See application file for complete search history.

(56) References Cited

U.S. PATENT DOCUMENTS

| 5,075,956 | A | 12/1991 | Das ................................. 29/603 |
| 6,738,233 | B2 | 5/2004 | Khizroev et al. ............. 360/319 |
| 6,954,340 | B2 | 10/2005 | Shukh et al. .................. 360/317 |
| 7,071,009 | B2 * | 7/2006 | Wang et al. ....................... 438/3 |
| 7,140,095 | B2 | 11/2006 | Matono ..................... 29/603.15 |
| 7,159,302 | B2 | 1/2007 | Feldbaum et al. ......... 29/603.12 |
| 7,212,379 | B2 | 5/2007 | Hsu et al. ...................... 360/126 |

(Continued)

FOREIGN PATENT DOCUMENTS

JP 3209609 9/1991

(Continued)

OTHER PUBLICATIONS

U.S. Appl. No. 12/634,490, filed Dec. 9, 2009.

*Primary Examiner* — Paul D Kim
(74) *Attorney, Agent, or Firm* — Zilka-Kotab, PC

(57) ABSTRACT

A method for manufacturing a magnetic write head having a leading magnetic shield and a trailing magnetic shield that are arranged to prevent the lost of magnetic write field to the trailing magnetic shield. The write head includes a non-magnetic step layer that provides additional spacing between the trailing magnetic shield and the write pole at a region removed from the air bearing surface.

9 Claims, 47 Drawing Sheets

U.S. PATENT DOCUMENTS

| | | | |
|---|---|---|---|
| 7,233,457 B2 | 6/2007 | Johnston et al. | 360/125 |
| 7,305,753 B2 | 12/2007 | Kobayashi | 29/603.16 |
| 7,343,668 B2 | 3/2008 | Kobayashi | 29/603.16 |
| 7,365,942 B2 | 4/2008 | Sasaki et al. | 360/126 |
| 7,377,024 B2 | 5/2008 | Chen | 29/603.13 |
| 7,443,633 B2 | 10/2008 | Tagami et al. | 360/125.5 |
| 7,463,450 B2 | 12/2008 | Sasaki et al. | 360/125.24 |
| 8,000,059 B2 * | 8/2011 | Jiang et al. | 360/125.3 |
| 2005/0219743 A1 | 10/2005 | Guan et al. | 360/125 |
| 2006/0245108 A1 | 11/2006 | Hsu et al. | 360/125 |
| 2007/0035885 A1 | 2/2007 | Im et al. | 360/317 |
| 2008/0024911 A1 | 1/2008 | Sasaki et al. | 360/110 |
| 2008/0112081 A1 | 5/2008 | Matono | 360/125.08 |
| 2008/0112088 A1 | 5/2008 | Hsiao et al. | 360/319 |
| 2008/0151437 A1 | 6/2008 | Chen et al. | 360/319 |
| 2008/0170334 A1 | 7/2008 | Otagiri | 360/313 |
| 2008/0259498 A1 | 10/2008 | Lengsfield et al. | 360/235.4 |
| 2008/0297953 A1 | 12/2008 | Matono et al. | 360/319 |
| 2008/0316653 A1 | 12/2008 | Sasaki et al. | 360/319 |
| 2009/0059426 A1 | 3/2009 | Sasaki et al. | 360/125.02 |
| 2009/0067098 A1 | 3/2009 | Kim et al. | 360/313 |
| 2009/0122445 A1 | 5/2009 | Jiang et al. | 360/123.12 |
| 2009/0141406 A1 | 6/2009 | Sasaki et al. | 360/319 |
| 2009/0154009 A1 | 6/2009 | Le | 360/110 |
| 2009/0154019 A1 | 6/2009 | Hsiao et al. | 360/234.3 |

FOREIGN PATENT DOCUMENTS

| | | |
|---|---|---|
| JP | 2007/257711 | 10/2007 |
| JP | 2008217846 | 9/2008 |
| JP | 2009009632 | 1/2009 |
| JP | 2009/048719 | 3/2009 |

* cited by examiner

METHOD FOR MANUFACTURING A MAGNETIC WRITE HEAD HAVING A WRAP AROUND SHIELD THAT IS MAGNETICALLY COUPLED WITH A LEADING MAGNETIC SHIELD

RELATED APPLICATIONS

The present application is related to commonly assigned U.S. patent application Ser. No. 12/634,490 entitled MAGNETIC WRITE HEAD MANUFACTURED BY DAMASCENE PROCESS PRODUCING A TAPERED WRITE POLE WITH A NON-MAGNETIC STEP AND NON-MAGNETIC BUMP, filed on Dec. 9, 2009, which is incorporated herein by reference.

FIELD OF THE INVENTION

The present invention relates to magnetic heads for data recording, and more particularly to a method for manufacturing a perpendicular magnetic write head having a tapered write pole, a non-magnetic bump for optimal trailing shield spacing, and a leading magnetic shield that is magnetically coupled with the trailing shield.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air hearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an anti ferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength and also maximize field gradient. A strong write field ensures that a magnetic bit can be'recorded in the magnetically hard top layer of the magnetic medium. A high field gradient allows for fast magnetic switching of the magnetic field from the write pole, thereby increasing the speed with which the magnetic transitions can be recorded. It is desirable to maximize both of these parameters, while also ensuring that the magnetic write pole does not become magnetically saturated at the pole tip.

SUMMARY OF THE INVENTION

The present invention provides a method for manufacturing a magnetic write head that has a leading shield and a trailing shield that are arranged so as to prevent magnetic write field from being drawn toward inner corner portions of the trailing magnetic shield. The method includes providing a substrate, and then forming a leading magnetic shield on the substrate. A non-magnetic RIE stop layer is formed over the leading magnetic shield, the RIE stop layer being a material that is resistant to removal by reactive ion etching. Then, a RIEable fill layer is deposited over the RIE stop layer, and a trench is formed in the RIEable fill layer. A non-magnetic track width reducing layer is deposited into the opening in the RIEable fill layer, and a magnetic material is electroplated over the non-magnetic track width reducing layer and into the trench to form magnetic write pole. A non-magnetic step layer is formed over a portion of the write pole, the non-magnetic step layer having a front edge that is recessed from an air bearing surface plane. A first ion milling is performed to form a tapered trailing edge surface on a portion of the write pole, and at least a portion of the RIEable fill layer is removed to expose the a portion of the RIE stop layer. A non-magnetic trailing gap layer is deposited, and a second ion milling is performed to remove the exposed portion of the RIE stop layer, thereby exposing a portion of the leading shield. Then, a magnetic trailing shield is formed over the write pole, the magnetic trailing shield contacting the exposed portion of the leading magnetic shield.

The above method allows the trailing shield to be in physical contact with the leading shield, thereby preventing the formation of singular points at inner corners of the side portions of the trailing magnetic shield. These singular points would otherwise attract magnetic write field from the leading edge of the write pole, thereby causing adjacent track interference and also enlarging the track width of the write head, which is of course undesirable.

In another embodiment of the invention a method is provided for constructing a write head wherein the trailing shield is separated from the write head by only a thin layer of trailing gap material. While the trailing and leading magnetic shields are not in physical contact, the close proximity of the leading shield with the side portions of the trailing shield prevents the formation of these singular points.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
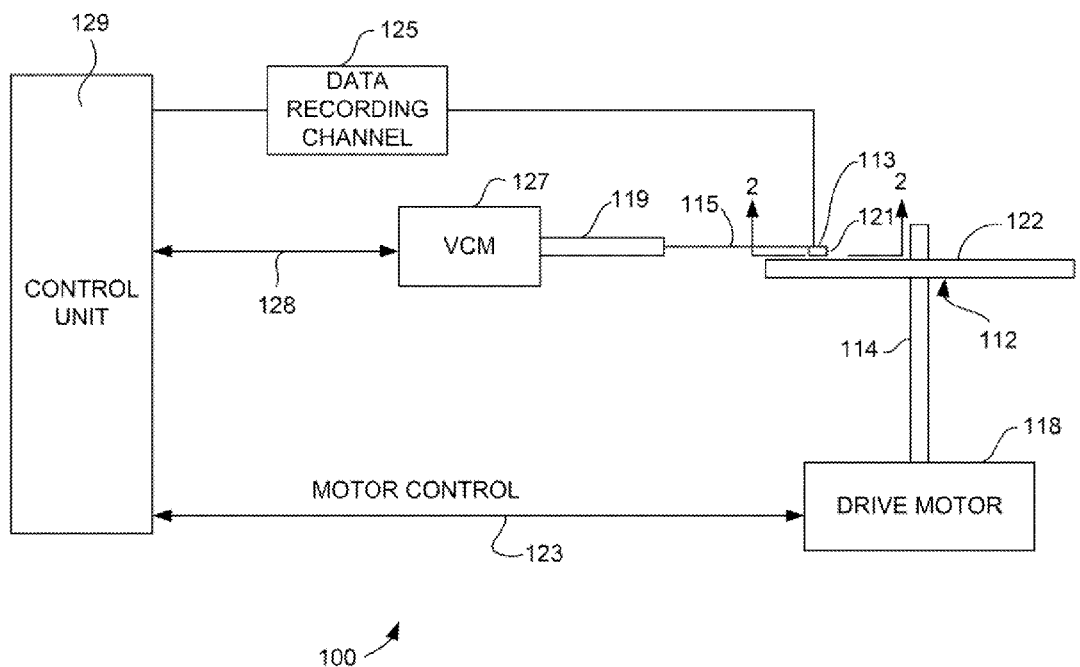
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
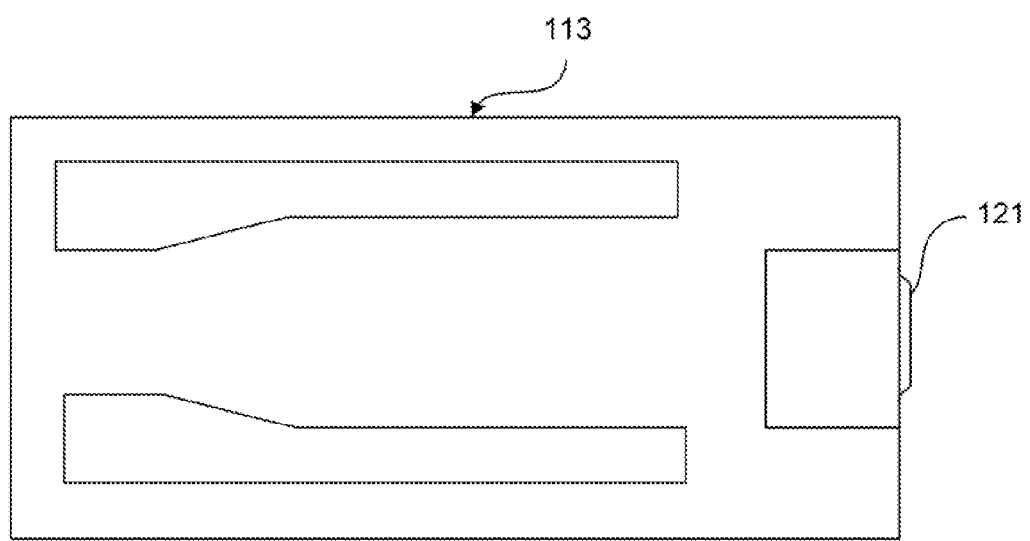
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
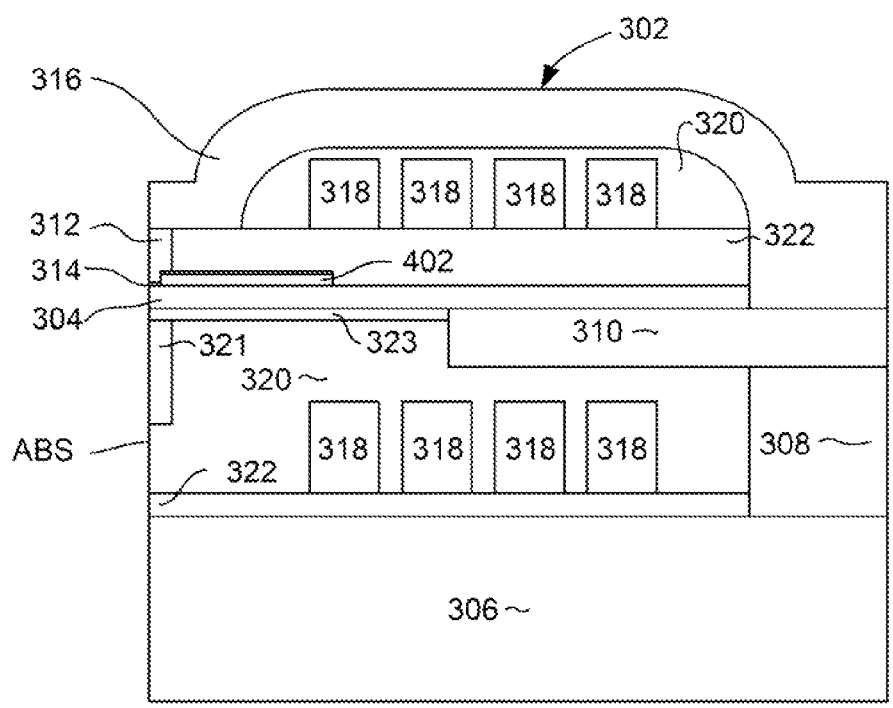
FIG. 3 is a cross sectional view of a magnetic write head according to an embodiment of the present invention.

With reference now to FIG. 3, the invention can be embodied in a magnetic head 302 having a tapered write pole and a non-magnetic bump. The write head 302 includes a magnetic write pole 304, and a magnetic return pole 306, both of which extend to an air bearing surface (ABS). A magnetic back gap layer 308 can be magnetically connected with the return pole 306 in a region removed from the ABS. However, the magnetic back gap 308 is optional. A magnetic shaping layer 310 can be connected with the back gap layer 308 and also with the write pole 304.

In order to increase field gradient to increase the speed with which magnetization of the write field can be switched, a trailing magnetic shield 312 is provided at the ABS, adjacent to the trailing edge of the write pole. The trailing shield 312 is separated from the write pole 304 by a non-magnetic trailing gap layer 314. A trailing return pole 316 can be provided to conduct magnetic flux from the trailing shield 312 to the shaping layer 310 and back gap 308. A leading magnetic shield 321 can also be provided, which is separated from the write pole 304 by a non-magnetic layer 323 that will be described in greater detail herein below.

A non-magnetic, electrically conductive write coil 318 passes above and below the write pole 304 and shaping layer 310. The write coil 318 (shown partially and in cross section in FIG. 3) can be constructed of a material such as Cu, and when an electrical current flows through the write coil 318, a resulting magnetic field causes a magnetic flux to flow through the return pole 306, back gap 308 and write pole 304. The write coil 318 can be encased within a non-magnetic, electrically insulating fill layer 320, such as alumina and or hard baked photoresist, and can be formed on a non-magnetic, electrically insulating under-layer 322, which also can be a material such as alumina.

Figure 4:
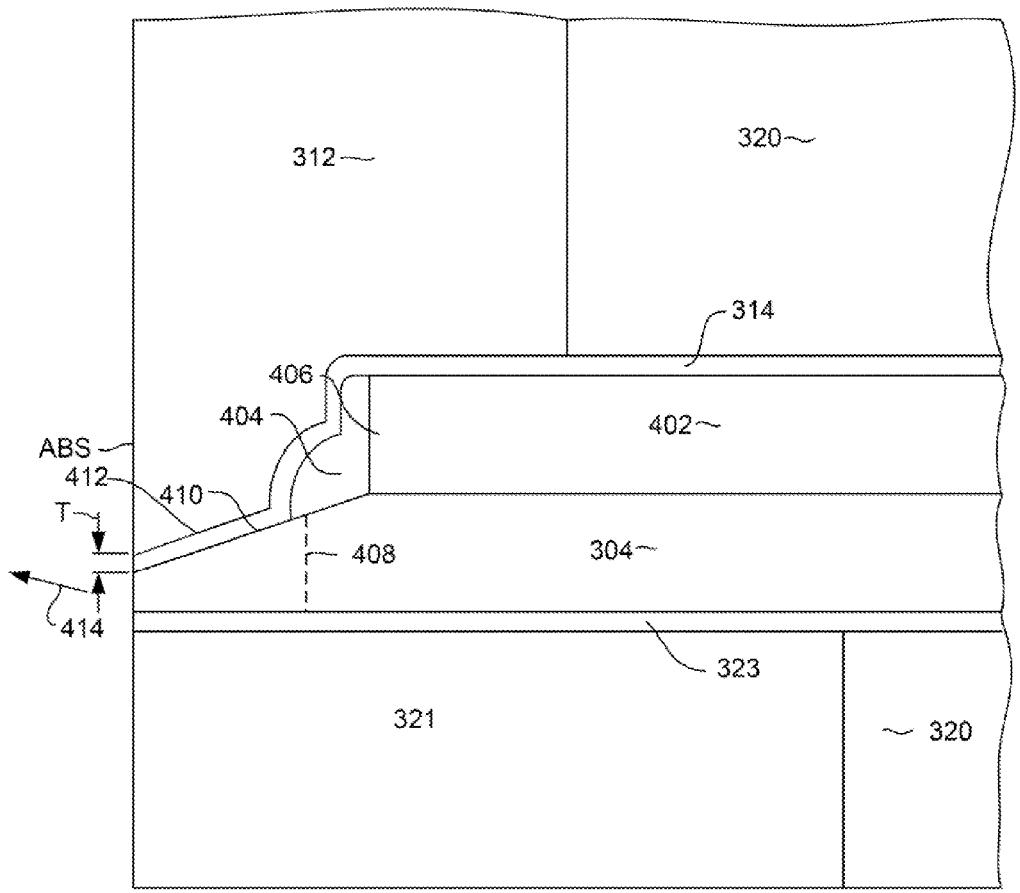
FIG. 4 is an enlarged view of a pole tip region of the magnetic recording head of FIG. 3.

The pole tip region of the write pole 314 can be seen more clearly with reference to FIG. 4, which shows an enlarged view of the pole tip portion of the write pole 304 and surrounding structure. A non-magnetic step layer 402 is formed over the write pole 304, and can be constructed primarily of non-magnetic materials such as NiCr, Cr, Ru, Ru/NiCr or Ta/Ru/NiCr. This non-magnetic step layer 402 is also a trailing edge taper mask, as will become clearer below, and may include a hard mask layer such as SiC, diamond like carbon (DLC) or $Al_2O_3$, which will be discussed in greater detail below.

The non-magnetic step layer 402 has a front edge 406, at an end closest to the ABS that may be slightly tapered backward relative to the ABS. A non-magnetic bump layer 404 is formed at the front edge 406 of the magnetic step layer 402. The front edge 406 is recessed from the ABS by a desired amount. The desired dimension of the front edge recess (distance between the ABS and the front edge 406) is between 100-250 nm. The distance between the front edge of non-magnetic bump 404 to ABS is about 50-150 nm. The flare point of the write pole is about 50-120 nm.

As can be seen, the write pole 304 has a tapered or sloped trailing edge portion 410 between the nonmagnetic step and the ABS. As can be seen, the trailing edge taper 410 terminates at the front edge 406 of the non-magnetic step layer 402. This is a result of manufacturing processes that will be described further below.

The presence of the non-magnetic step layer 402 helps to reduce magnetic flux loss between the pole tip portion of the write pole 304 and the trailing shield 312. The tapered trailing edge portion, 412 further promotes the focusing of magnetic flux to the pole tip while avoiding magnetic saturation of the pole tip portion of the write pole 304.

The trailing magnetic shield 312 helps to increase the field gradient of the magnetic write field 414 emitted from the tip of the write pole 304. This increase in field gradient helps to define a sharper written transition, thereby improving signal-to-noise ratio and increasing data density.

Optimal functioning of the trailing shield involves a tradeoff between maximizing field gradient improvements and minimizing the loss of write field to the trailing shield. The write head is preferably designed so as to prevent magnetic saturation of the trailing shield 312. In addition, the spacing between the write pole 402 and the trailing shield 312 is preferably such that the write field is maximized at the tip of the write pole 402, and also such that little write field leaks from the write pole 402 to the trailing shield 312.

The present invention optimizes both of these goals. The write gap 314 has a thickness "T" that provides a desired spacing between the write pole 304 and the trailing shield 312 at the pole tip. This spacing T can therefore be controlled by controlling the as deposited thickness of the trailing gap layer 314.

The location of the front edge 406 of the magnetic step layer 402, as well as the initiation point of the steep tapered trailing edge portion 410 of the write pole 304, are critical regions for the leakage of flux from the write pole 304 to the trailing shield. This is because of the sudden channeling of magnetic flux from the write pole 304 into a much smaller pole tip portion of the write pole 304. In order to prevent the leakage of magnetic flux at this point, the non-magnetic bump 404 and the non-magnetic step 402 advantageously increases the magnetic spacing between the trailing shield 312 and the write pole 304. As can be seen, the spacing between the write pole 304 and the trailing shield 312 at this point is the sum of the thickness of the bump 404 and the thickness of the gap layer 314 in the region immediately in front of the step 402, and the spacing is the sum of the step 402 and the thickness of the gap layer 314 behind the step 402. The non-magnetic bump 404 can be constructed of a material such as alumina and can be formed by a manufacturing process that will be described in greater detail herein below.

Figure 5:
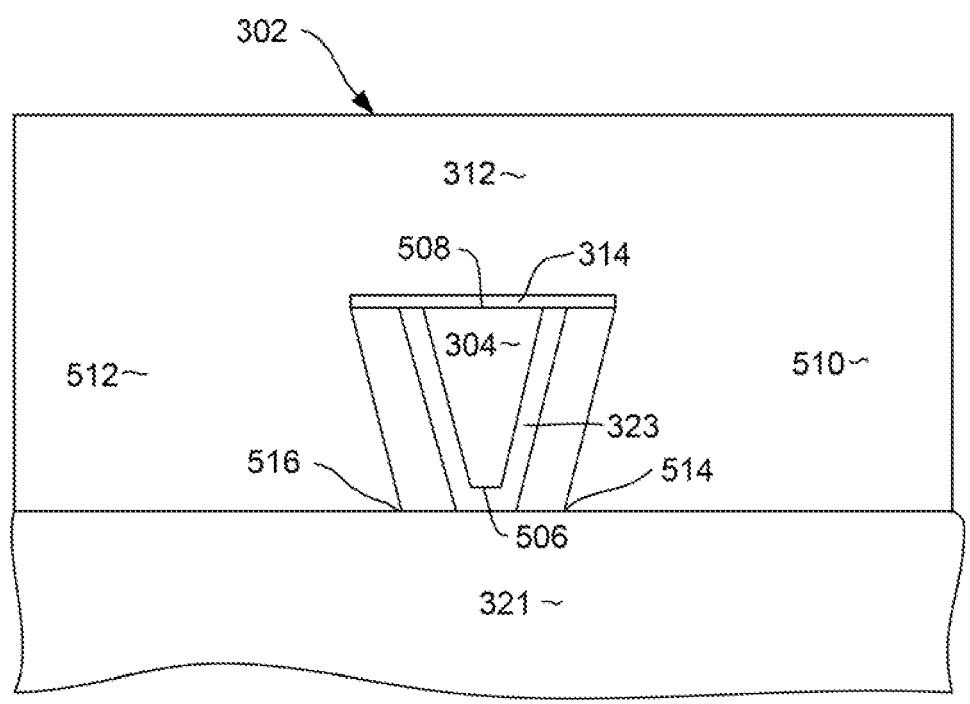
FIG. 5 is an ABS view of the magnetic recording head of FIGS. 3 and 4.

FIG. 5 shows an enlarged view of a portion of the write head 302 as viewed from the air bearing surface ABS. As can be seen, the write pole 304 as viewed from the ABS has a narrow, trapezoidal shape. In fact, the tip of the write pole 304 is so narrow that is nearly resembles a triangular shape, having a leading edge 506 that is extremely small (smaller than the trailing edge 508), the leading edge 506 of the write pole 304 defining the track width of the write pole 304. Also as can be seen in FIG. 5, the trailing shield 312 is actually a wrap-around trailing shield, having side portions 510, 512 that extend down the sides of the write pole 304. The side portions 510, 512 of the shield 312 are separated from the write pole 304 by first and second side gap layers 502, 504 that can be constructed of a non-magnetic material such as alumina.

Also, it can be seen that the side portions 510, 512 of the trailing, wrap around shield 312 contact the leading magnetic shield 312. This contact between the side portions 510, 512 and the leading shield 321 prevents the formation of "singular points" at the inner corners 514, 516 of the side portions 510, 512 of the trailing shield. If the leading shield 321 magnetically connected with the side portions 510, 512, these singular points 514, 516 would attract magnetic write field from the leading edge 506 of the write pole 304. This would lead to an undesirable adjacent track interference as well as poor track-width definition. It can also be seen, however, that the leading edge 506 of the write pole 304 is separated from the leading shield 321 by the non-magnetic layer 323. This layer 323 is preferably significantly thicker than the trailing gap layer 314, and will be described in greater detail herein below, along with a description of a method for manufacturing a magnetic head according to an embodiment of the invention.

The construction of the write pole 304, side gaps 502, 504, trailing gap 314 and shield 312 will be described in greater detail below.

Figure 6:
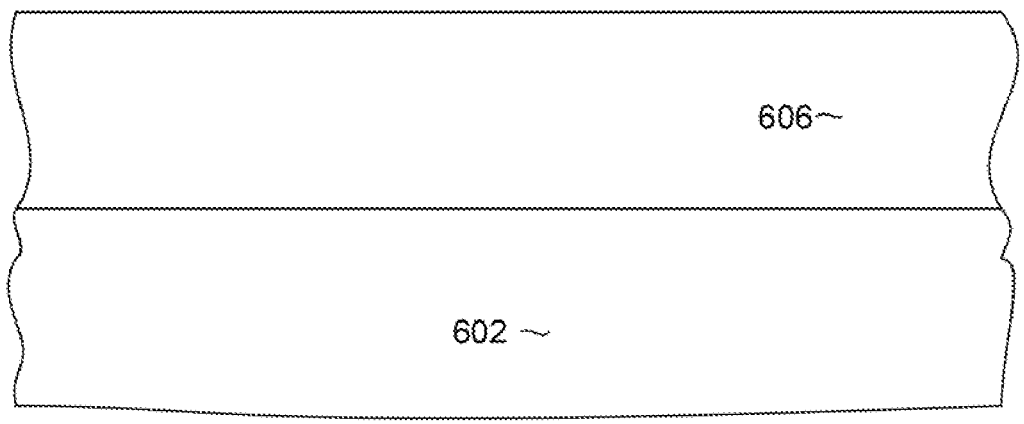
FIGS. 6-25, are views of a portion of a magnetic write head in various intermediate stages of manufacture, illustrating a method for manufacturing a magnetic write head according to an embodiment of the invention.

FIGS. 6-25 illustrate a method for manufacturing a magnetic write head according to an embodiment of the invention. With reference to FIG. 6 a substrate 602 is provided, a portion of which is actually the leading magnetic shield 321 described above with reference to FIG. 3. This substrate 602 can also include the insulating fill layer 320 and shaping layer 310 of FIG. 3. Then, a RIEable fill layer such as $SiO_2$ or alumina ($Al_2O_3$) is deposited over the substrate 602. The RIEable fill layer is deposited to a sufficient thickness to form a write pole therein, as will become apparent below.

Figure 7:
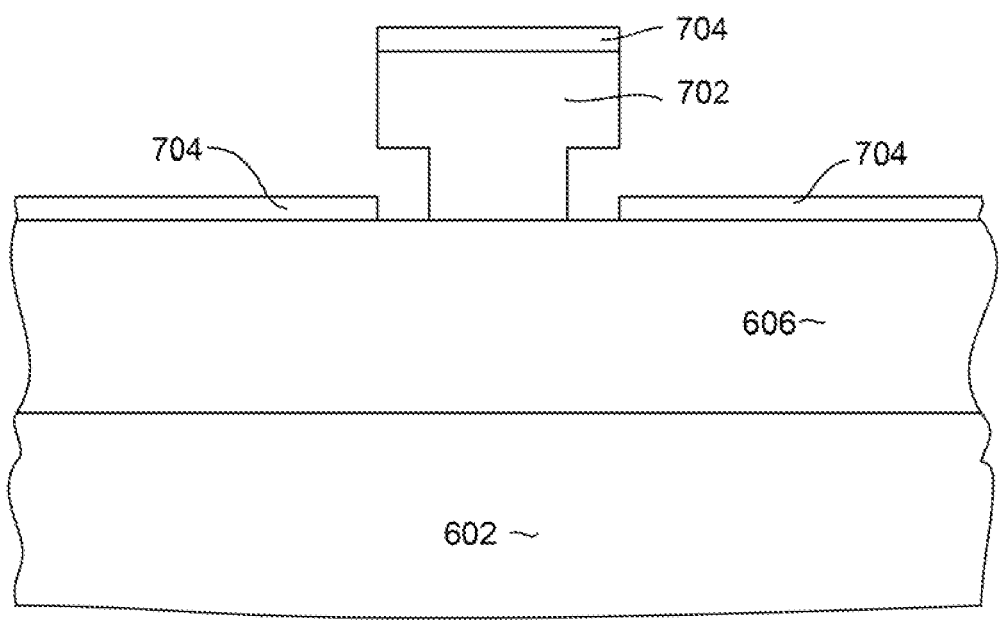

With reference now to FIG. 7, a bi-layer photoresist mask structure 702 is formed over the RIEable fill layer 606. The mask 702 is configured to define a write pole shape, as will become apparent below. Then, a RIE hard mask layer 704 is deposited over the fill layer 606 and mask 702. The hard mask layer 704 can include one or more of, Ta, Cr, NiCr, etc.

Figure 8:
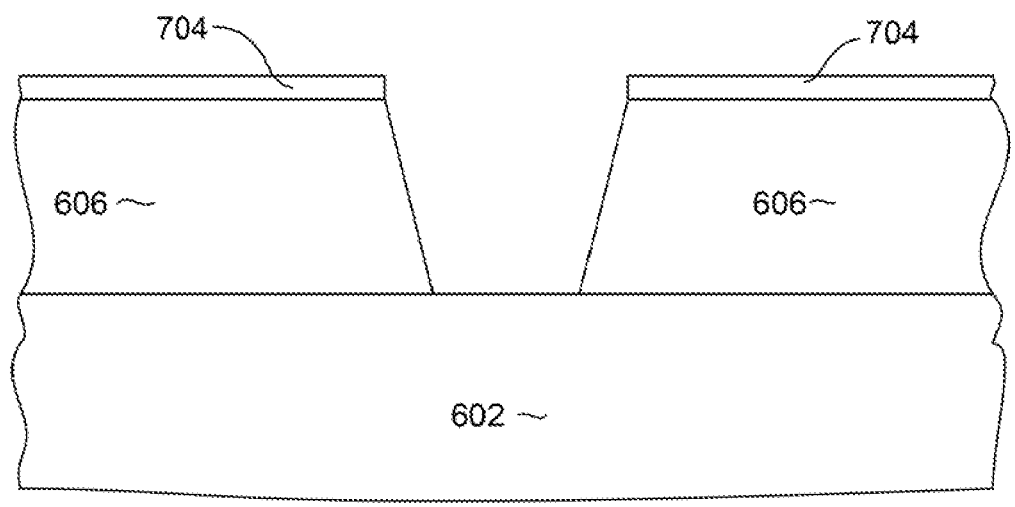
Figure 9:
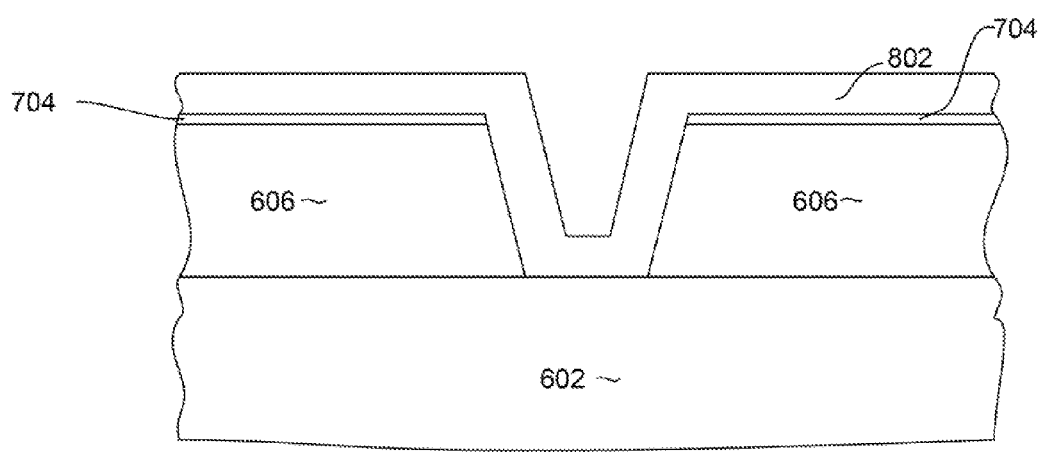
Figure 10:
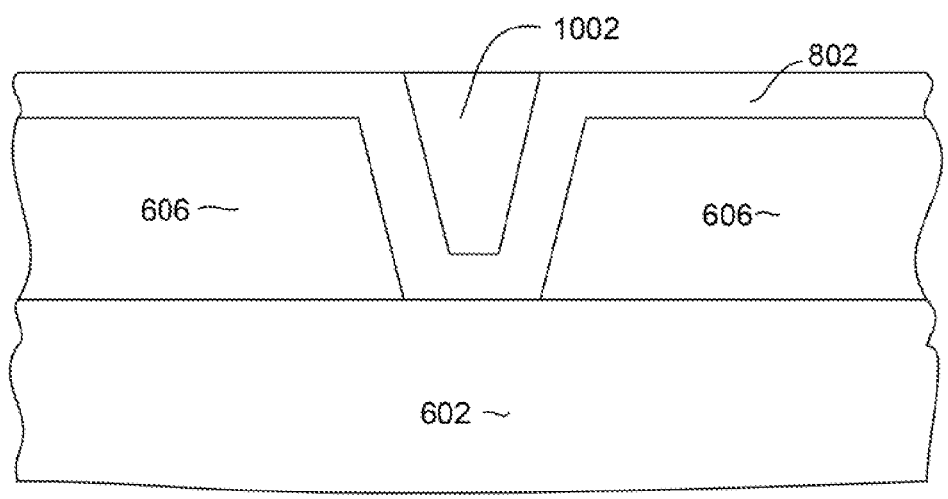

The mask structure 702 can be lifted off, and then a reactive ion etching (RIE) can be performed to remove portions of the fill layer 606 that are not protected by the RIE hard mask 704. The RIE is preferably performed in such a manner to form a trench with tapered side walls in the fill layer 606 as shown in FIG. 8. Then, with reference to FIG. 9 a non-magnetic track width reducing layer 802 can be deposited to reduce the width of the trench formed in the fill layer 606. The track-width reducing layer 802 can be a material such as $Al_2O_3$ deposited by atomic layer deposition (ALD) or Ru (which may also be deposited by ALD). Then, a magnetic material 1002 can be electroplated, and a chemical mechanical polishing (CMP) can be performed, leaving a structure such as that shown in FIG. 10, with a write pole 1002 formed by the above described damascene process. An ion milling can be performed to remove portions of the track width reducing layer 802 that extend over the fill layer 606.

Figure 11:
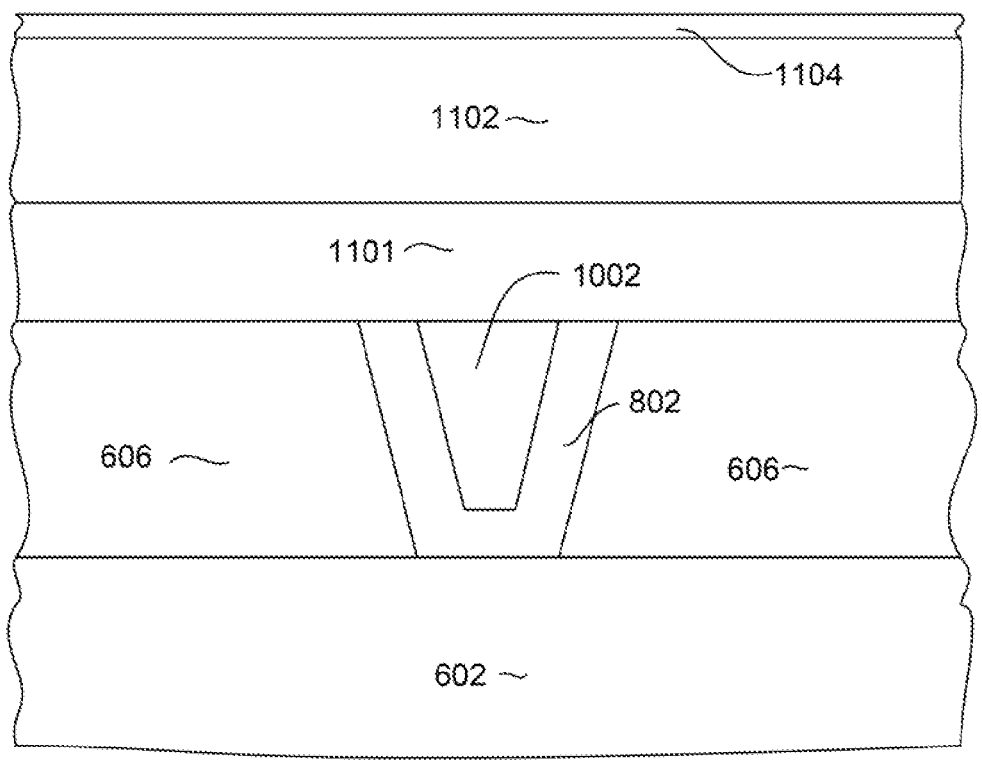

With reference now to FIG. 11, a non-magnetic step layer 1101 is deposited over the write pole 1002 and layers 606 and 802. The non-magnetic step layer 1101 can be a material such as NiCr, Ru or Ir, and can be deposited to a thickness of about 50 to 200 nm. A milling mask layer 1102 constructed of a material such as SiC or $Al_2O_3$ is then deposited over the non-magnetic step layer 1101, and can be deposited to a thickness of about 50 to 300 nm. A thinner RIE hard mask 1104 is then deposited over the milling mask layer 1102. The RIE hard mask layer 1104 can be constructed of a material such as Cr, NiCr and can be deposited to a thickness of about 5 to 100 or about 30 nm.

Figure 12:
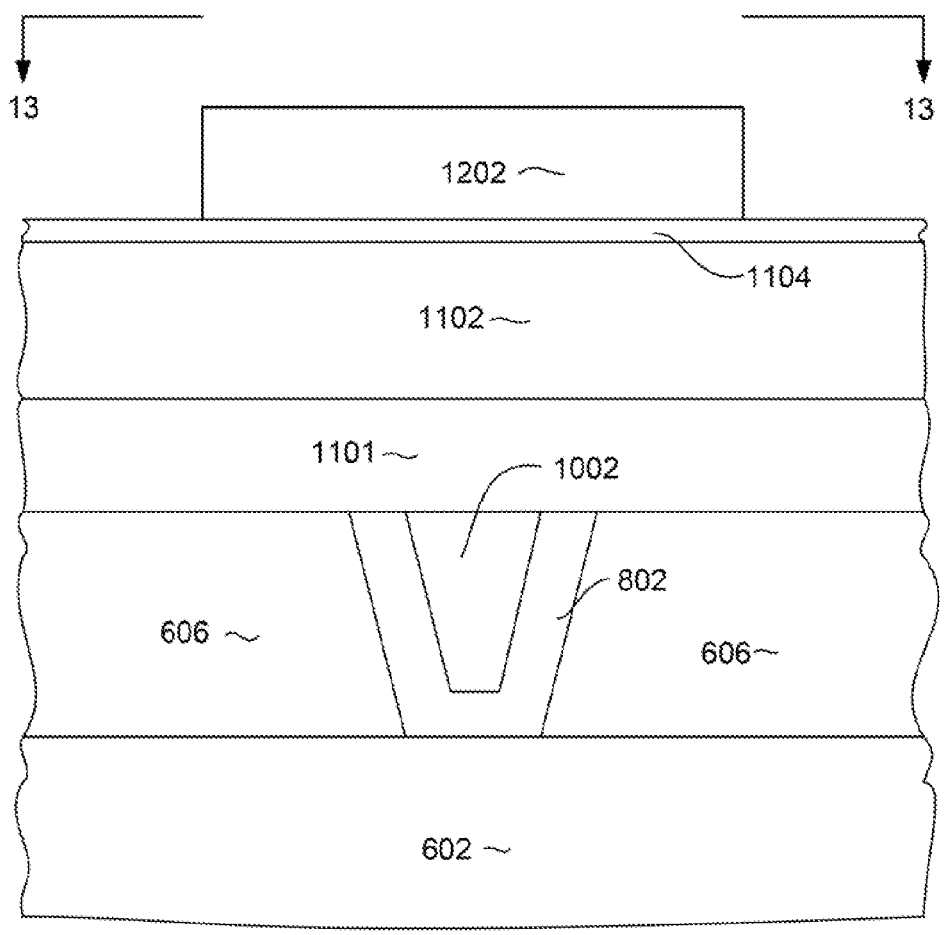
Figure 13:
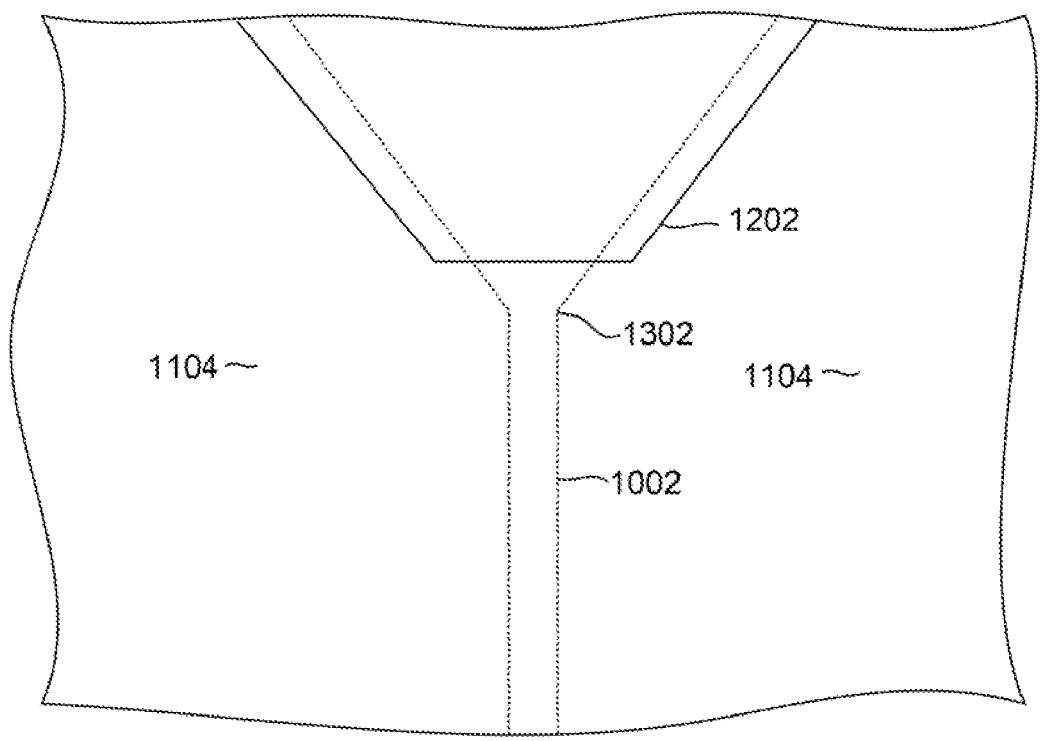

With reference now to FIG. 12, a photoresist mask 1202 is formed over the RIE hard mask 1104. The photoresist mask 1202 is patterned to define a desired step, and its shape can be seen more clearly with reference to FIG. 13, which shows a top down view as shown from lines 13-13 of FIG. 12. In the view of FIG. 13, the write pole 1002 is shown in dashed line to indicate that it is hidden beneath layers 1101, 1102, 1104 (FIG. 12). As shown in FIG. 13, the write pole 1002 has a flare point 1302 and the photoresist layer 1202 has a front edge 1304 that is behind the flare point 1302.

Figure 14:
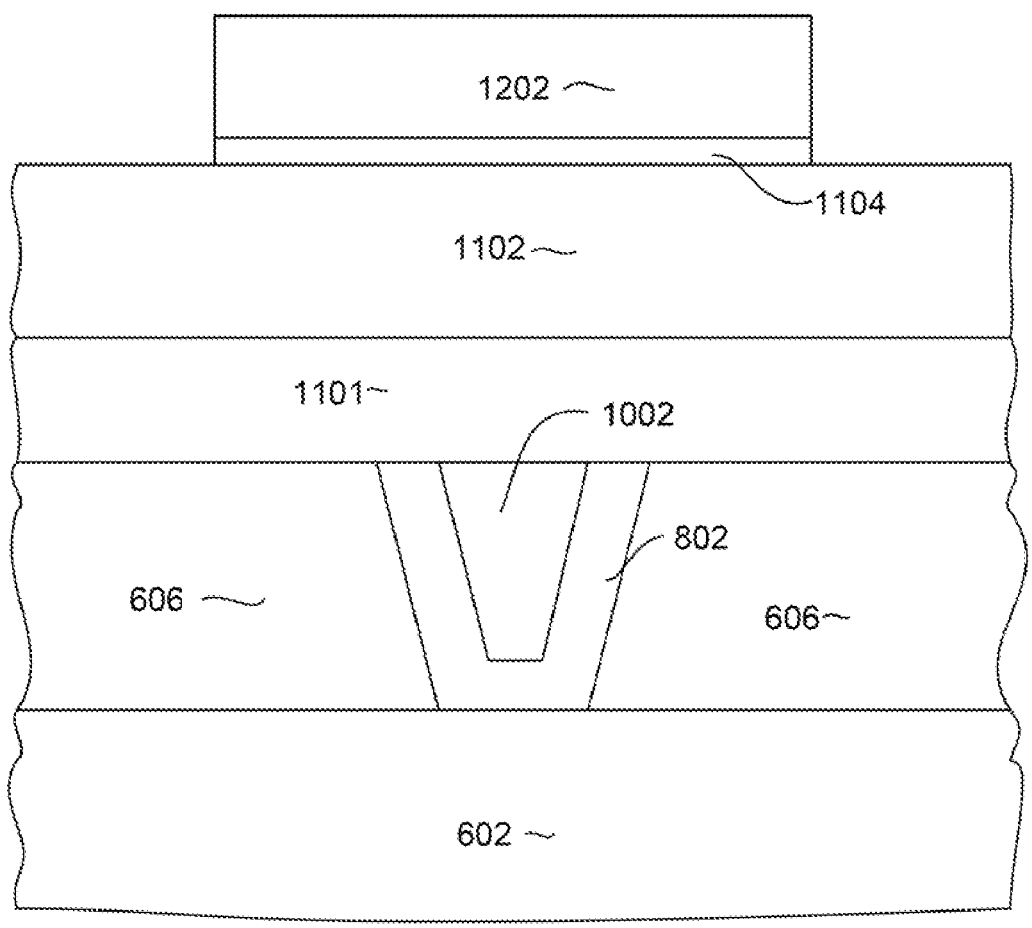
Figure 15:
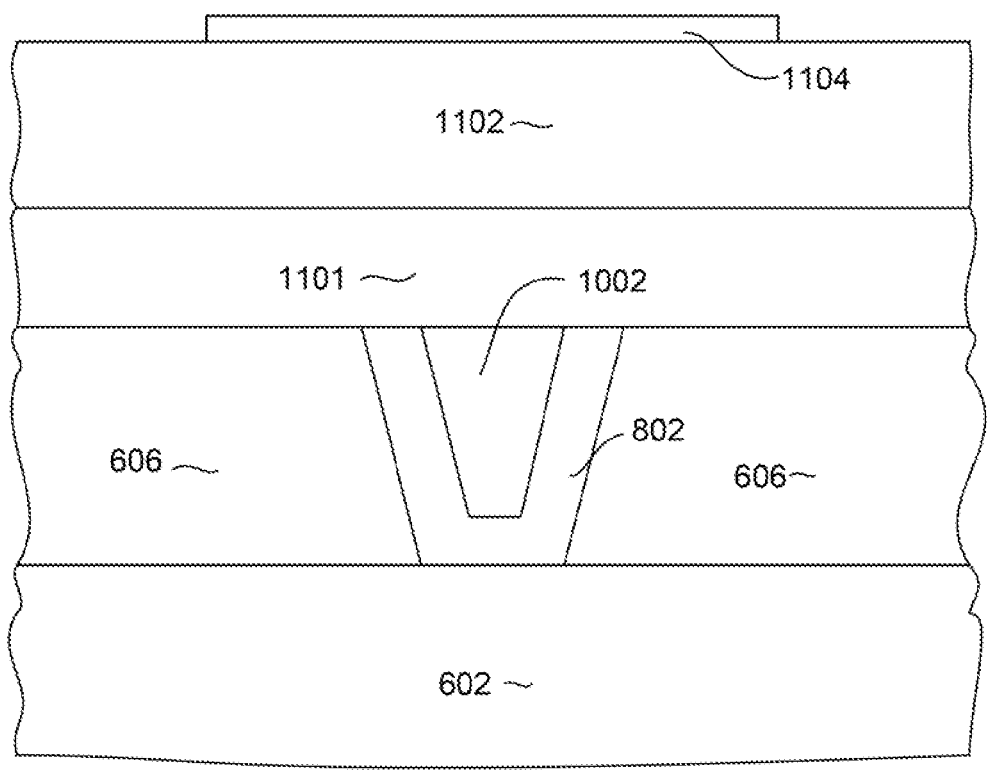
Figure 16:
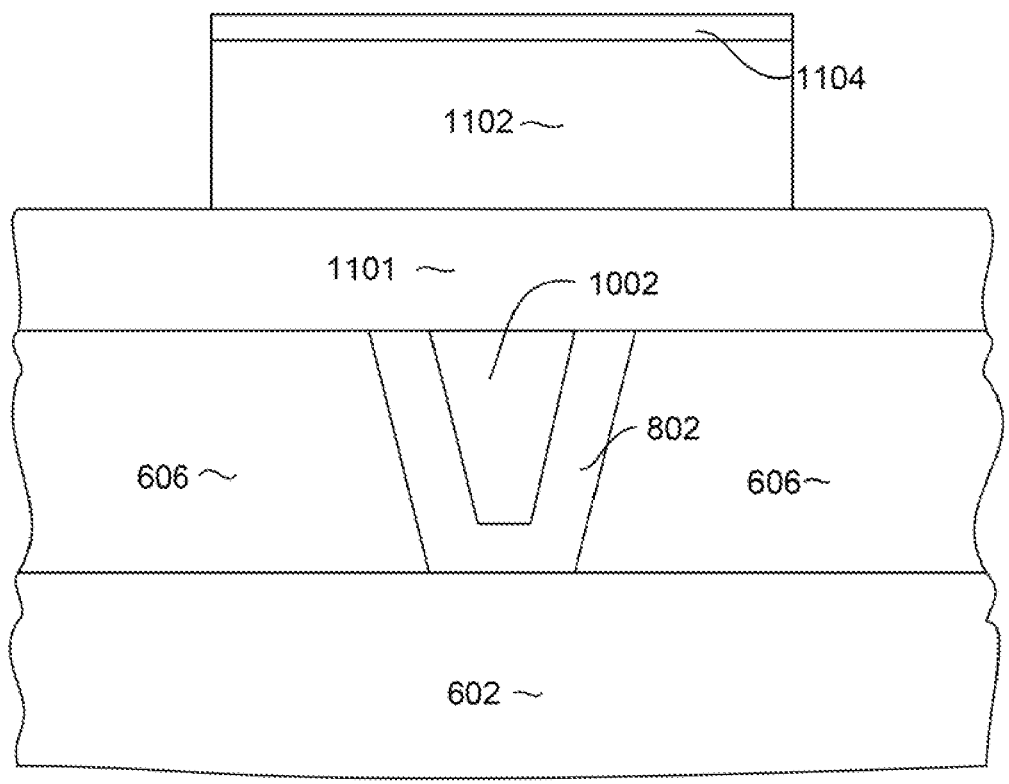

With reference now to FIG. 14, an ion milling is performed to transfer the image of the photoresist layer 1202 onto the underlying hard mask layer 1104. The photoresist layer can then be lifted off, leaving a structure as shown in FIG. 15. Then, a reactive ion etching (RIE) is performed to remove portions of the milling mask layer 1102 that are not protected by the hard mask 1104, leaving a structure as shown in FIG. 16.

Figure 17:
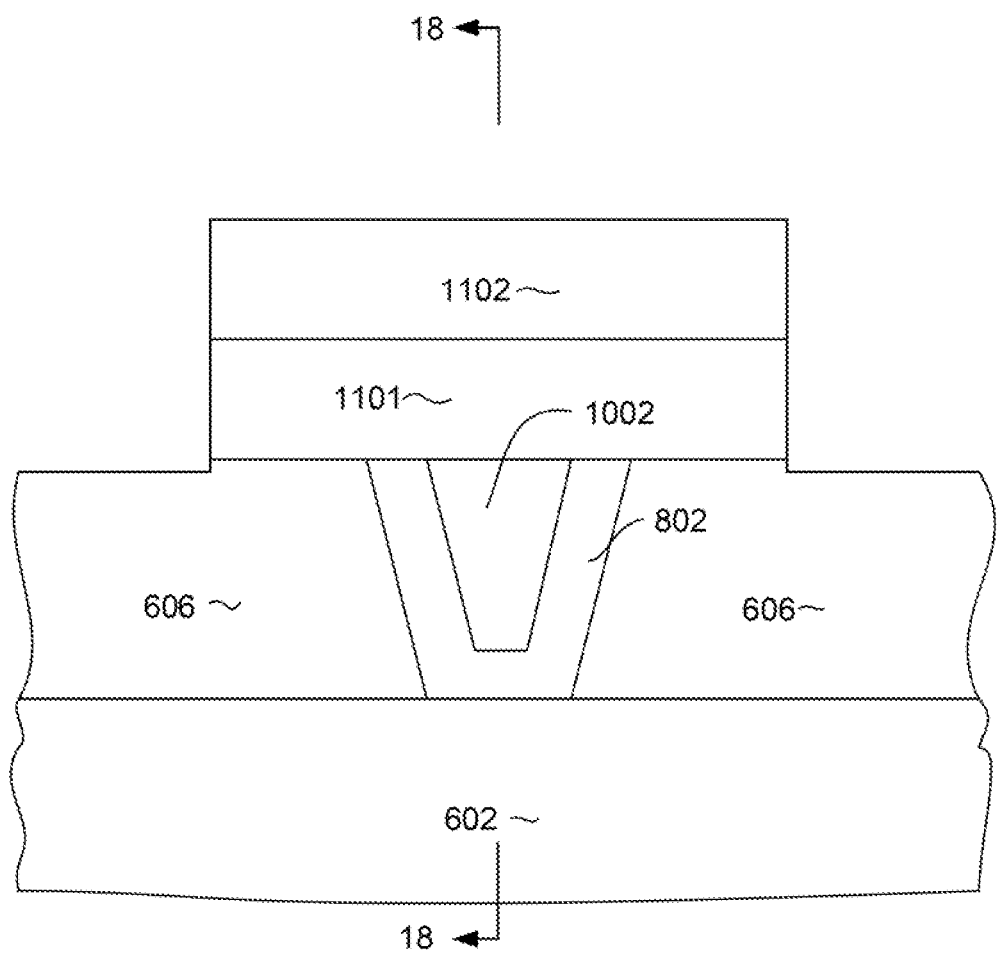
Figure 18:
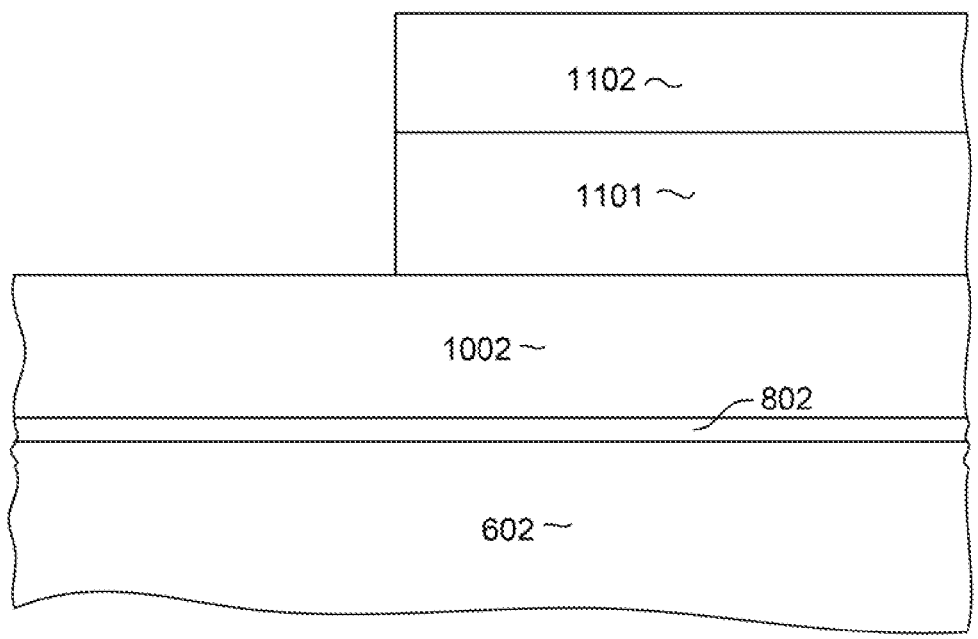

A first ion milling is then performed to remove portions of the step layer 1101, and track width reducing layer 802 that are not protected by the mask layers 1102, 1104, leaving a structure as shown in FIG. 17. This first ion milling is preferably performed at normal or near normal to the plane of the deposited layers, and as can be seen, the first ion milling is terminated when the RIEable fill layer 606 has been reached. FIG. 18, shows a cross sectional view, taken from line 18-18 of FIG. 17.

Figure 19:
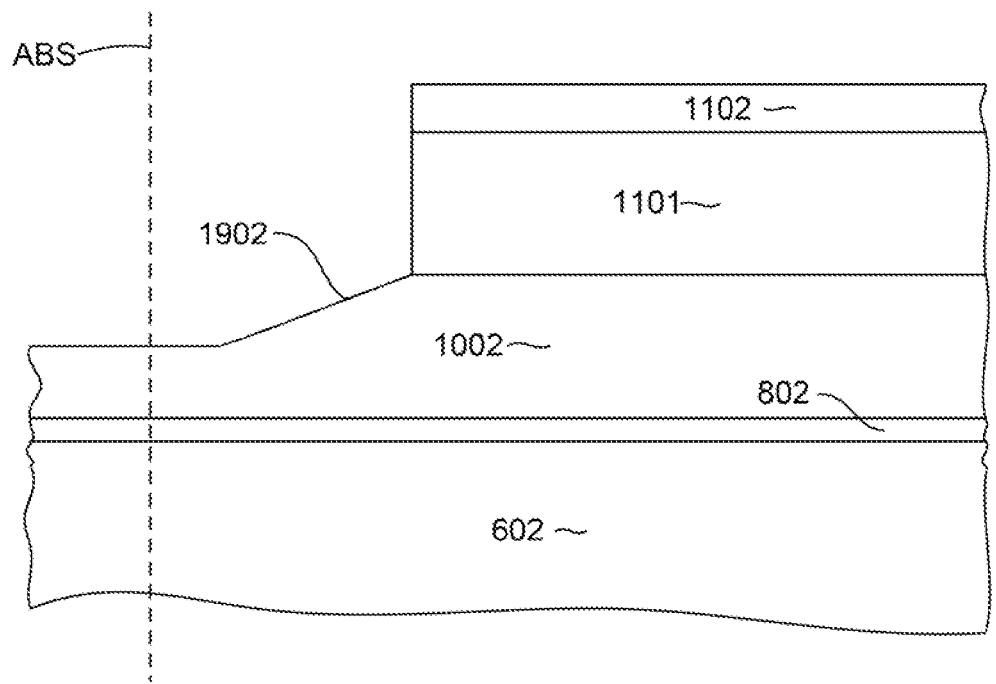

With reference now to FIG. 19, a second ion milling is performed to form a first taper to the trailing edge of the magnetic write pole material 1002. This second ion milling is preferably performed at an angle relative to normal so that shadowing from the layers 1101, 1102 causes the second ion milling to form a tapered surface 1902 on the magnetic write pole layer 1002. The tapered surface 1902 preferably forms and angle 1904 that is 20 to 40 degrees or about 35 degrees relative to horizontal (i.e. relative to the as deposited surface planes of the layers 604, 802, 1102, 1101, 1102. It can be seen, in FIG. 19 that the tapered portion 1902 of the surface of the magnetic write pole layer 1002 terminates short of the air bearing surface, the location of the intended air bearing surface plane being indicated in FIG. 19 by the dashed line denoted as (ABS). This will form a first tapered portion 1902 of the write pole layer 1002, a second portion being formed as described herein below. It can also be seen that an additional portion of the mask layer 1102 is consumed by the second ion milling, such that the layer 1102 is thinner in FIG. 19 than it is in FIG. 18.

While the first and second ion milling operations have been described above as separate ion milling operations, in an alternate method, the first and second ion millings can be combined into a single ion milling operation. In this case, the single, combined ion milling would be used both to pattern the image of layer 1102 onto layer 1101, and also to form the tapered surface 1902 on the layer 1002.

Figure 20:
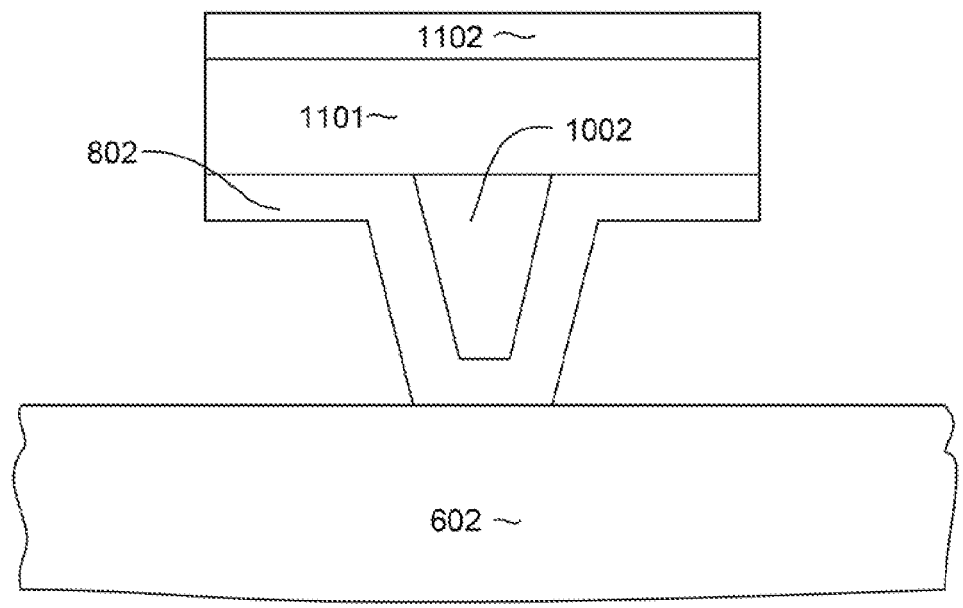
Figure 21:
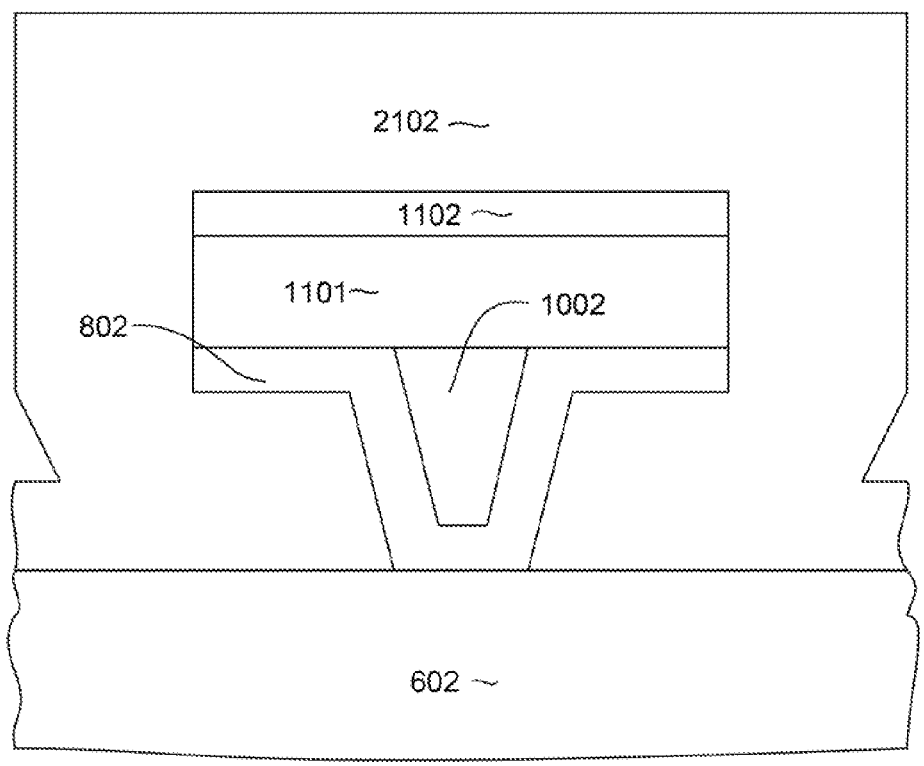

After the second ion milling (or combined first and second ion millings) a reactive ion etching is performed to remove the RIEable fill layer 606 (FIG. 17) leaving a structure such as that shown in FIG. 20, which shows a cross sectional view of a plane parallel with the air bearing surface (ABS). If the fill layer 606 is alumina rather than a material such as $SiO_2$. Then, a wet etch can be used to remove the fill layer 606.

Figure 22:
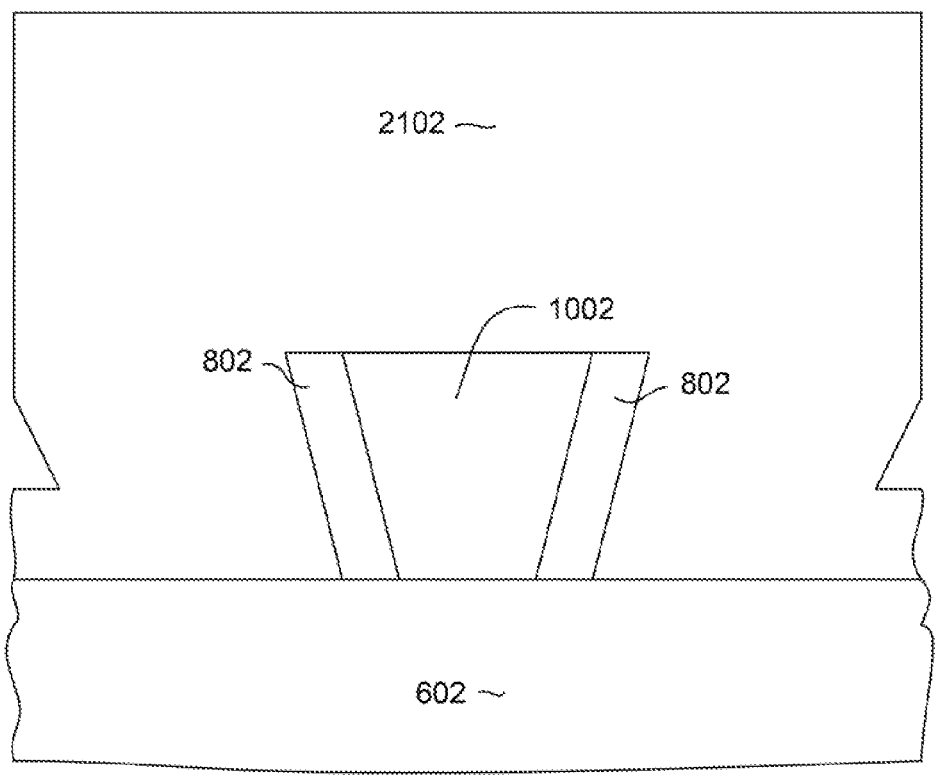
Figure 23:
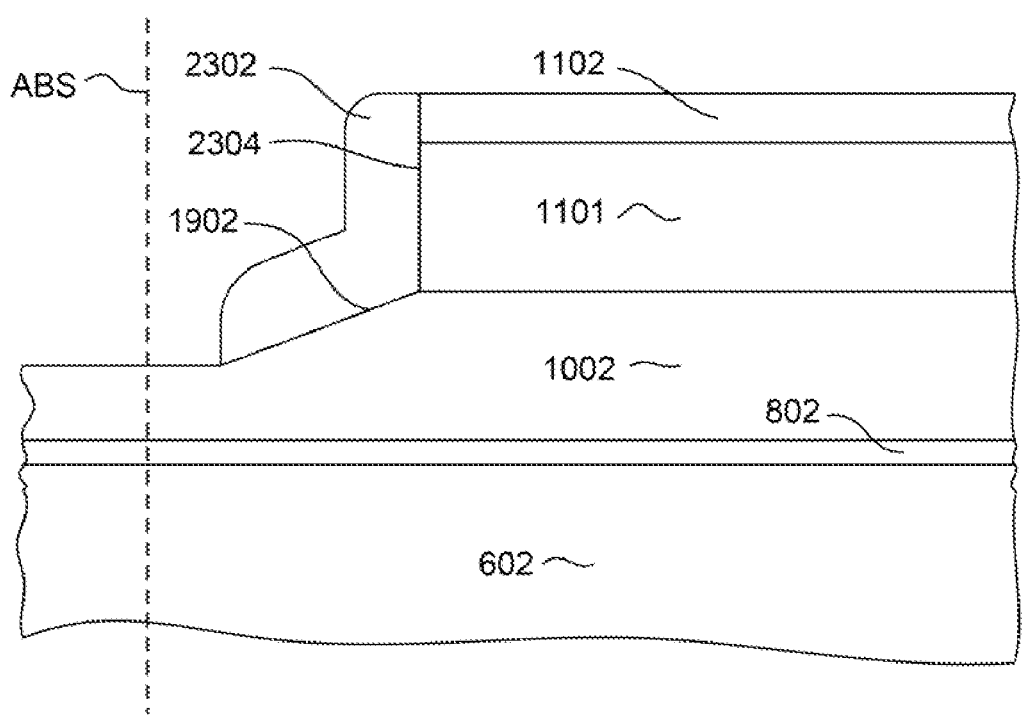
Figure 24:
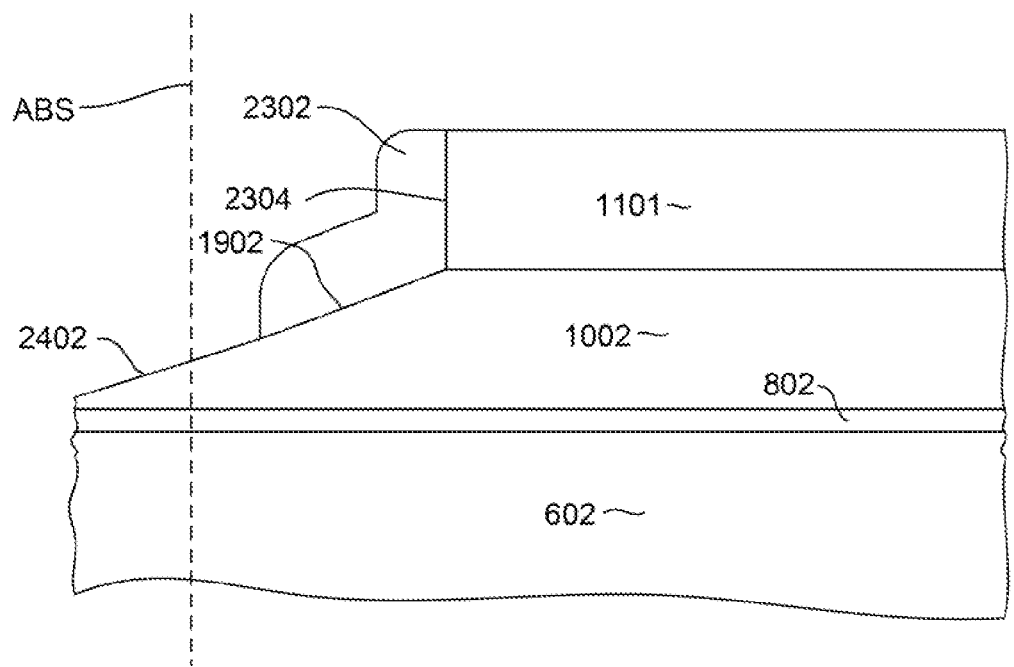

Then, a thick layer of alumina 2102 is deposited by a conformal deposition method such as Atomic Layer Deposition (ALD). This alumina layer 2102 can be deposited to a thickness of about 30 to 150 nm or about 60 nm. Then, a third ion milling (ALD ion milling) is performed to remove a portion of the alumina layer 2102. This ALD ion milling preferentially removes horizontally disposed portions of the alumina layer, leaving alumina side walls 2102 as shown in FIG. 22. FIG. 22 shows a view of the ABS plane, shown as dashed line ABS in FIG. 19. This ion milling also leaves an alumina bump layer 2302 as shown in FIG. 23. This alumina bump layer is formed on the front edge 2304 of the layers 1101, 1102. As can be seen, in FIG. 23, the transition from the tapered surface 1902 of layer 1002 to the relatively flat surface 2306 of the layer 1002 occurs before the ABS. That is, the taper 1902 does not extend to the ABS.

Then, yet another ion milling (fourth ion milling or second taper ion milling) is performed to finish forming the taper on the trailing edge of the magnetic write pole layer 1002. It will be recalled that the previously performed ion milling formed the first taper portion 1902. This taper portion 1902 terminated short of the ABS plane. The non-magnetic, alumina bump layer 2302 now covers this first taper portion 1902. The second ion milling forms a second taper portion 2402 that extends beyond the ABS plane, the alumina bump layer 2302 protecting the first taper portion 1902 during this fourth (second taper) ion milling. This ion milling is preferably performed at such an angle and in such a matter as to for the second taper 2402 with an angle of 30-40 degrees or about 35 degrees relative to the surface of the layers 602, 604, 802, 1002, 1101.

Forming the taper portions 1902, 2402 in the above described two step process provides distinct advantages. For example, the location of the front end of the non-magnetic bump can be easily controlled. As will be recalled, the ALD milling process described above that was used to form the non-magnetic bump preferentially removed horizontally disposed portions of the alumina layer 2302. This means that the front edge of the alumina bump 2302 terminated at the front edge of the first taper portion 1902. This allows for accurate control of the front edge of the alumina bump 2302. The above process provides improved process repeatability and control of the location of the front edge of the bump 2302.

Figure 25:
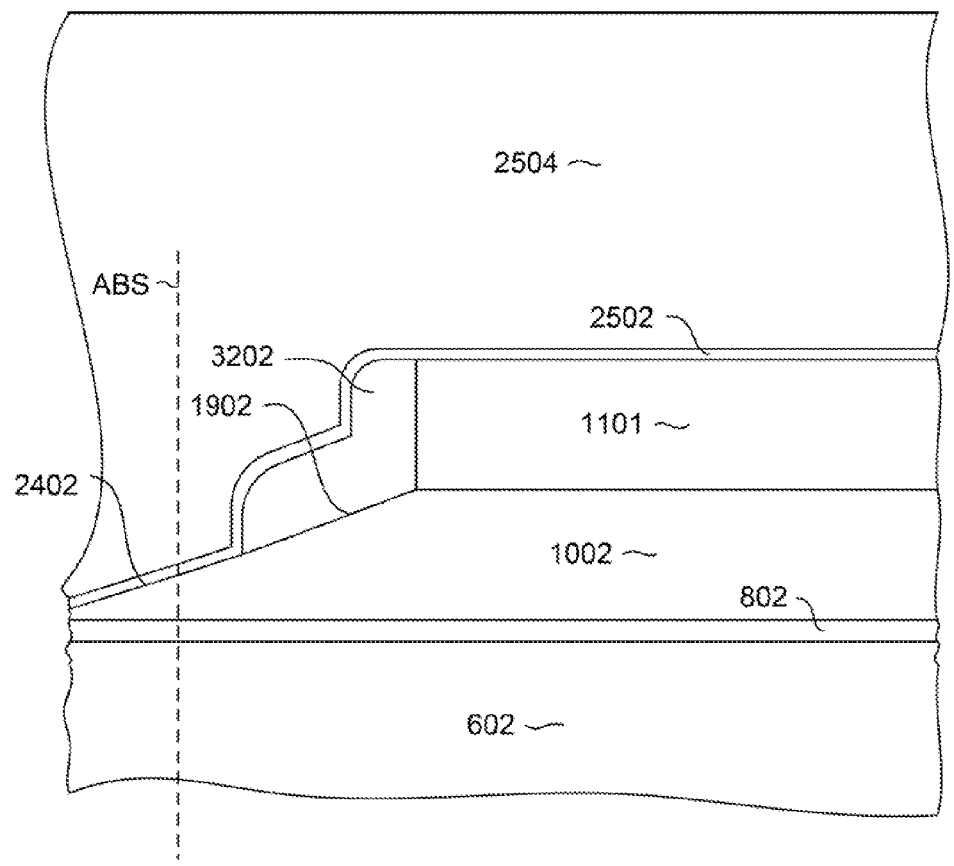

With reference now to FIG. 25, a non-magnetic, electrically insulating layer 2502 is deposited. This layer 2502 serves as both a trailing gap layer and an electroplating seed. Therefore, the layer 2502 is deposited to a thickness of a desired trailing gap. Then, an electroplating frame mask (not shown) is formed and a magnetic material 2504 such as CoFe or NiFe is deposited by electroplating to form a wrap-around, trailing magnetic shield, corresponding to the shield 312 of FIGS. 3, 4 and 5, wherein the shield 2504 has side portions (not shown in FIG. 25) that contact the leading shield 602.

Figure 26:
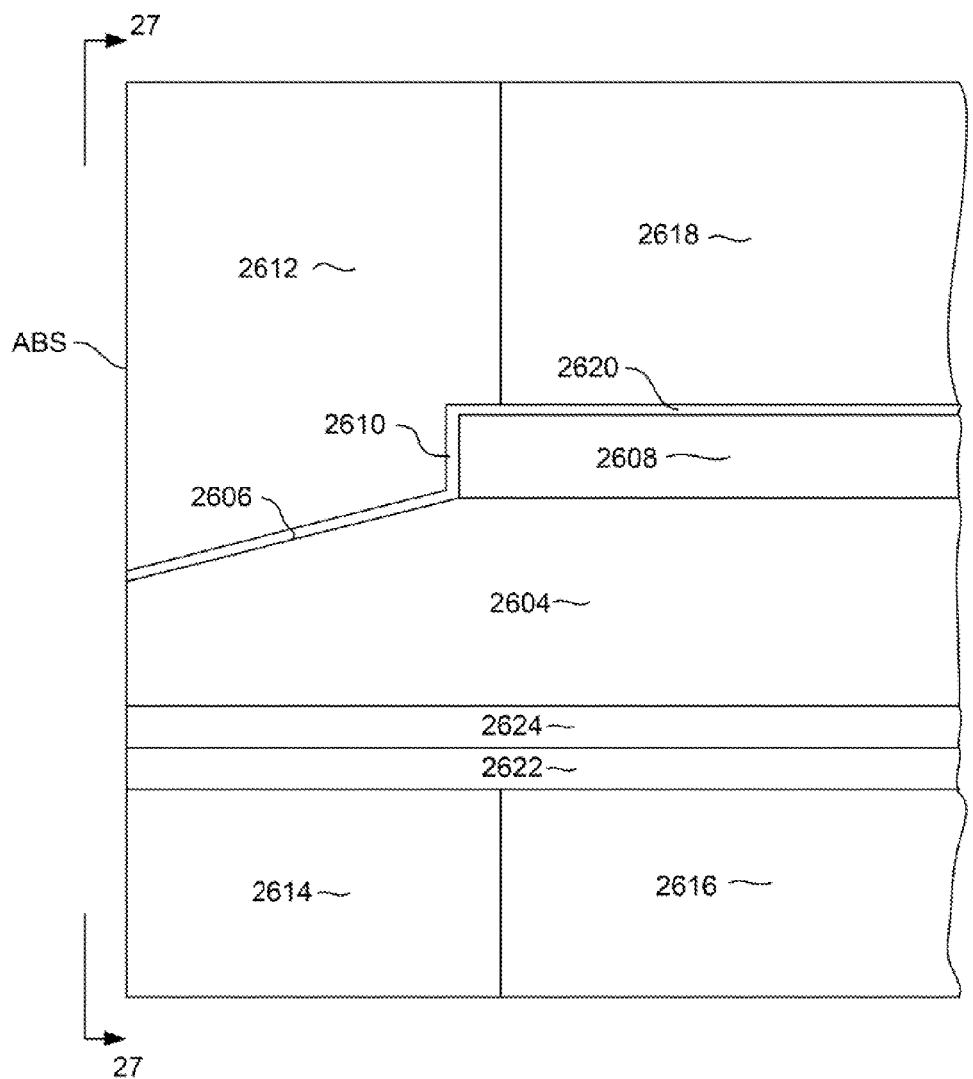
FIG. 26 is a side cross sectional view of a portion of a write head according to an alternate embodiment of the invention.
Figure 27:
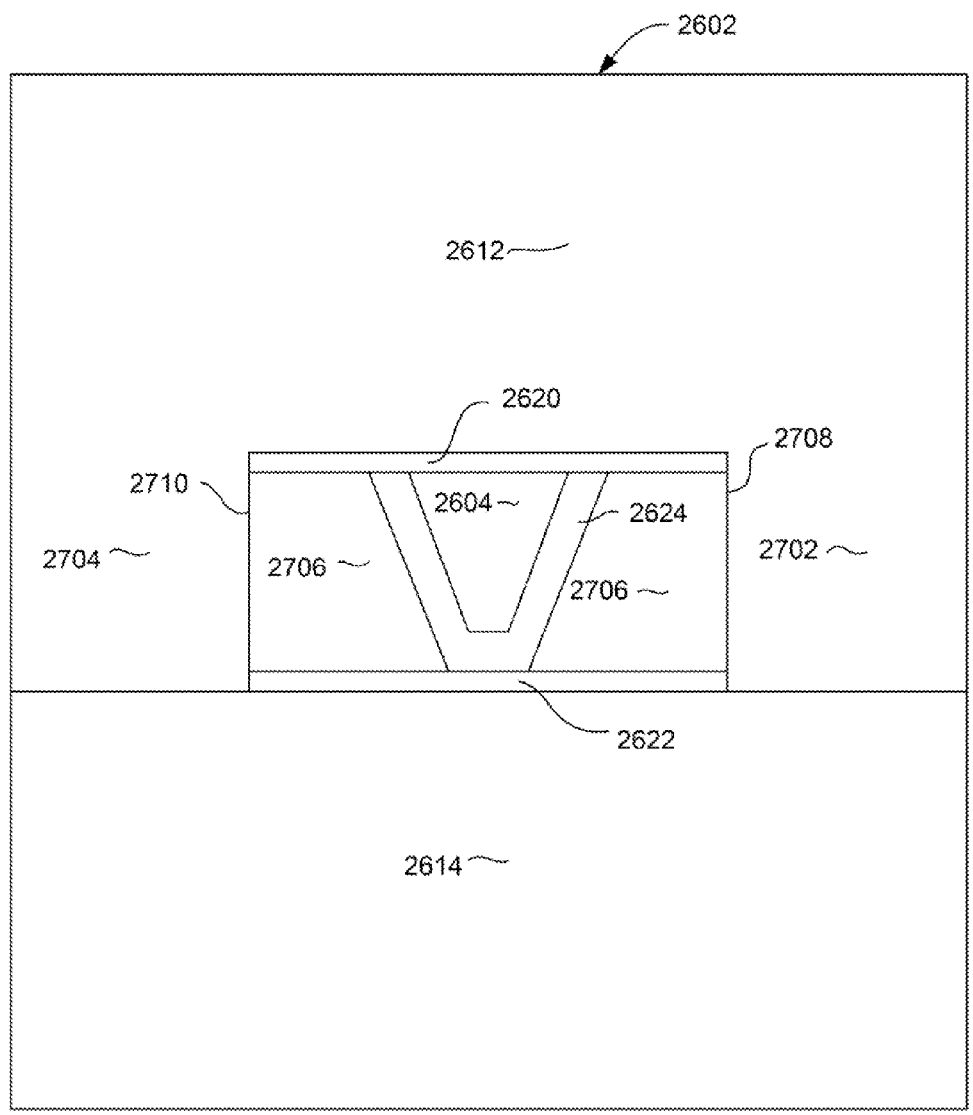
FIG. 27 is an ABS view of a portion of the write head of FIG. 26, as seen from line 27-27 of FIG. 26.

With reference now to FIGS. 26 and 27 another embodiment of the invention is described. FIG. 26 shows a side cross sectional enlarged view of a pole tip portion of the write head 2602, and FIG. 27 shows an ABS view as seen from line 27-27 of FIG. 26. The write head 2602 includes a write pole 2604 that has a tapered trailing edge 2606 and a non-magnetic spacer layer 2608 that has a front edge 2610 that is recessed from the air bearing surface ABS. The tapered portion of the trailing edge 2606 preferably extends from the ABS to the front edge 2610 of the spacer layer 2608.

The write head 2602 also includes a trailing magnetic shield 2612 and a leading magnetic shield 2614. Non-magnetic fill layers such as alumina 2616, 2618 may be provided behind the trailing and leading shields. There may also be a trailing return pole that connects the trailing shield 2612 with other magnetic portions of the write head (similar to the pole 316 of FIG. 3) however this is not shown in FIG. 26.

The trailing shield 2612 is separated from the write pole by a non-magnetic trailing gap layer 2620 which may be a material such as Ru, the thickness of which defines a desired trailing gap TG. The leading shield 2614 is separated from the write pole by a pair of non-magnetic layers 2622, 2624, the combined thicknesses of which define a leading gap LG. The leading gap LG is significantly larger than the trailing gap TG, and is preferably about 4 times as thick as the trailing gap TG or at least twice as thick as the trailing gap TG. The bottom non-magnetic layer 2622 can be constructed of a non-magnetic material that is resistant to reactive ion etching, such as for example Cr, NiCr or a combination of these materials. The second non-magnetic layer 2624 can be constructed of a material such as Ru.

FIG. 27 shows an air bearing surface view of the write head 2602. With reference to FIG. 27 it can be seen that the trailing magnetic shield 2612 has side portions 2702, 2704 that extend down beside the write pole 2604, and that these side portions actually contact the leading magnetic shield 2614. As discussed with regard to the previously described embodiment, this connection between the side portions 2702, 2704 of the trailing shield 2612 and the leading shield 2614 prevents the formation of singular points at inner corners of the side portions 2702, 2704, thereby improving magnetic write field strength, avoiding adjacent track interference and improving track width definition.

In FIG. 27 it can also be seen that the non-magnetic material 2624 covers the sides of the write pole and also the leading edge of the write pole, but not the trailing edge of the write pole. A non-magnetic RIEable fill material 2706 extends from the sides of the write pole 2604 and non-magnetic layer 2624, the non-magnetic fill material 2706 terminating at outer edges 2708, 2710. The distance between the write pole 2604 and these outer edges 2708, 2710 define a side gap thickness between the side shield portions 2702, 2704 and the write pole 2604. As can be seen, these sides 2708, 2710 are substantially vertical in FIG. 27 and do not taper with the write pole 2704. This therefore, provides additional spacing between the bottom inner corners 2712, 2714 of the side shield portions 2702, 2704 and the write pole 2604 because of the taper of the write pole 2604. This additional spacing further prevents the formation of singular points.

It can also be seen in FIG. 27 that the non-magnetic trailing gap layer 2620 terminates at the outer edges 2708, 2710 and that the bottom, non-magnetic RIE stop layer 2622 also terminates at the outer edges 2708, 2710. The structure of the head 2602 described above can be constructed by a method that is described in detail herein below.

Figure 28:
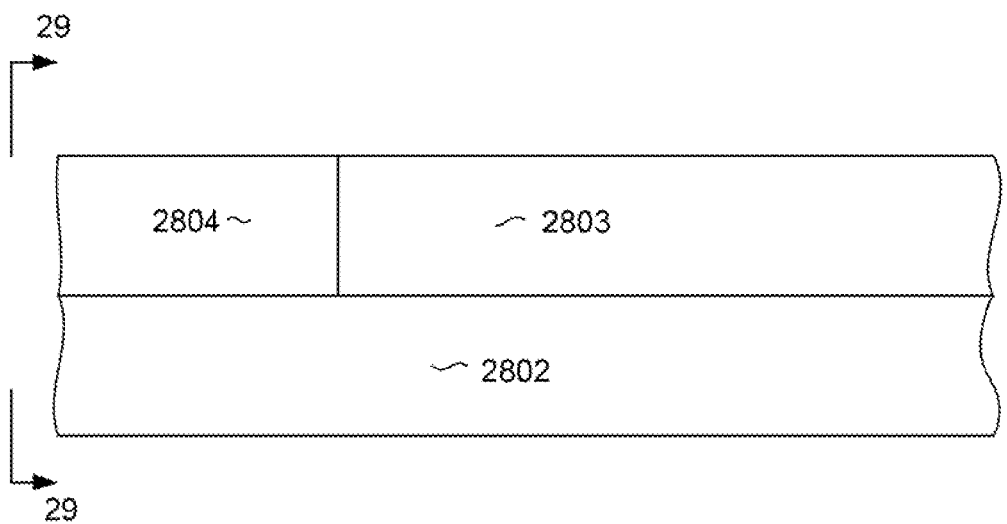
FIGS. 28-36 are views of a write head in various intermediate stages of manufacture, illustrating a method of manufacturing a write head according to an alternate embodiment of the invention.
Figure 29:
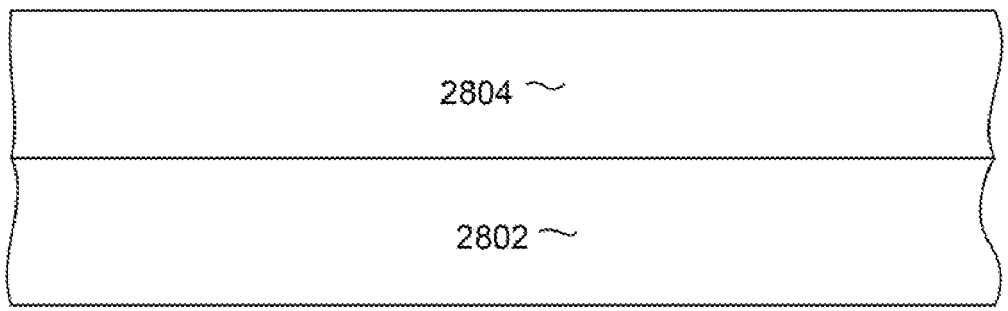

FIGS. 28-37 describe a method for manufacturing a write head such as the write head 2602 of FIGS. 26 and 27. With particular reference to FIG. 28, a substrate 2802 is provided. This substrate can be a non-magnetic, electrically insulating material such as alumina or could be some other structure. Then, a magnetic shield structure 2804 is formed over the substrate 2802 and a non-magnetic fill layer 2803 can be deposited behind the magnetic shield 2802. FIG. 29 shows a view of the structure as seen from line 29-29 of FIG. 28.

Figure 30:
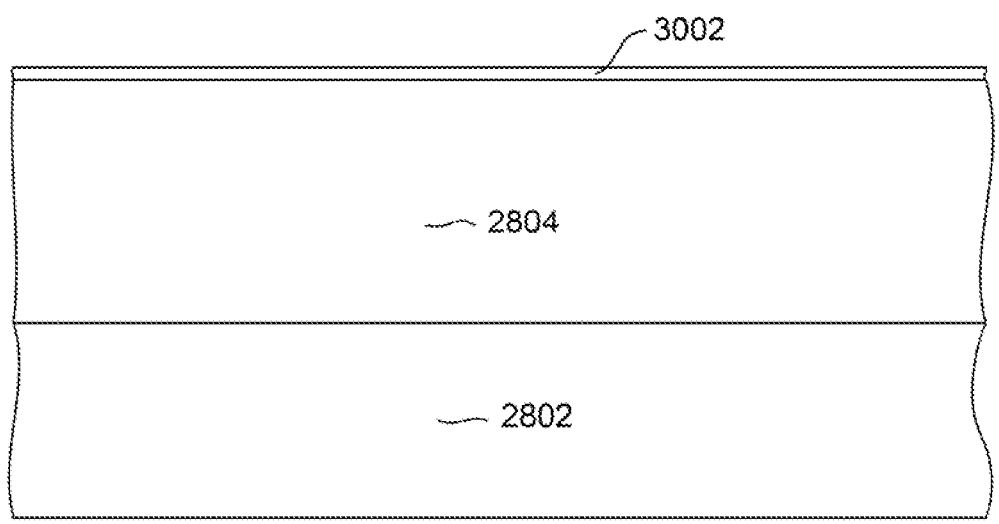
Figure 31:
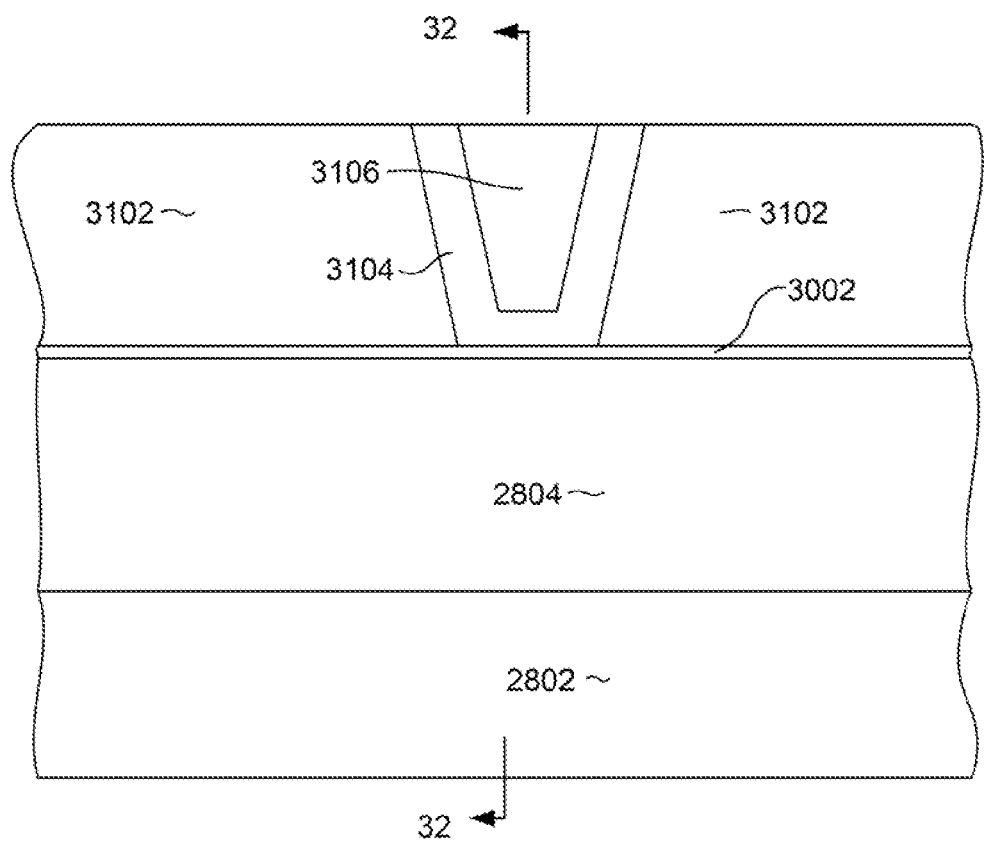

Then, a layer of non-magnetic material that is resistant to reactive ion milling (RIE stop layer 3002) is deposited as shown in FIG. 30 which shows a view similar to that of FIG. 29. Then, as seen in FIG. 31 magnetic write pole 3106 is then formed over the RIE stop layer 3002 by a damascene method such as that described above with reference to FIGS. 6-10. This damascene process also forms a non-magnetic layer (preferably Ru) 3104 at the sides and leading edge of the write pole 3106 and also a non-magnetic RIEable fill layer 3102 at either side of the write pole 3106 and non-magnetic layer 3104. The non-magnetic fill layer 3102 is preferably alumina or SiO$_2$.

Figure 32:
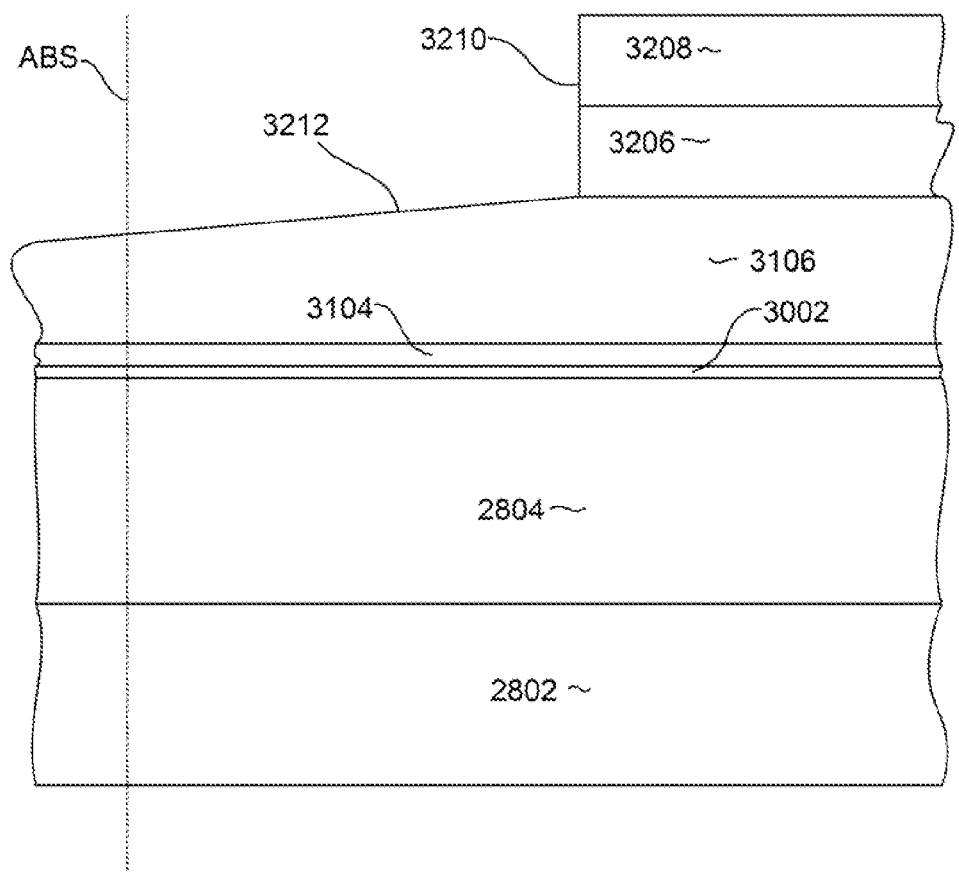

FIG. 32 shows a side cross sectional view as taken from line 32-32 of FIG. 31. As shown in FIG. 32, a non-magnetic spacer layer 3206 is formed over the write pole 3106, and a milling mask layer 3208 is formed over the non-magnetic spacer layer 3206. The non-magnetic spacer layer 326 and mask layer 3208 can be formed by methods such as those described above with reference to FIGS. 11-19 and are formed with a front edge 3210 that is located a desired distance from an intended air bearing surface plane indicated by dashed line designated as ABS. With the mask 3208 and non-magnetic spacer layer 3206 formed, an ion milling is performed to remove a portion of the write pole material 3106, thereby forming the write pole 3106 with a tapered trailing edge 3212. The ion milling can be performed at one or more angles relative to normal so that shadowing from the layers 3206, 3208 allows the ion milling to form the desired taper. The tapered surface 3212 preferably defines an angle of 30-40 degrees or about 35 degrees relative to horizontal (ie. relative to the planes of the surfaces of the as deposited layers 2802, 2804, 3002, 3104, 3106.

Figure 33:
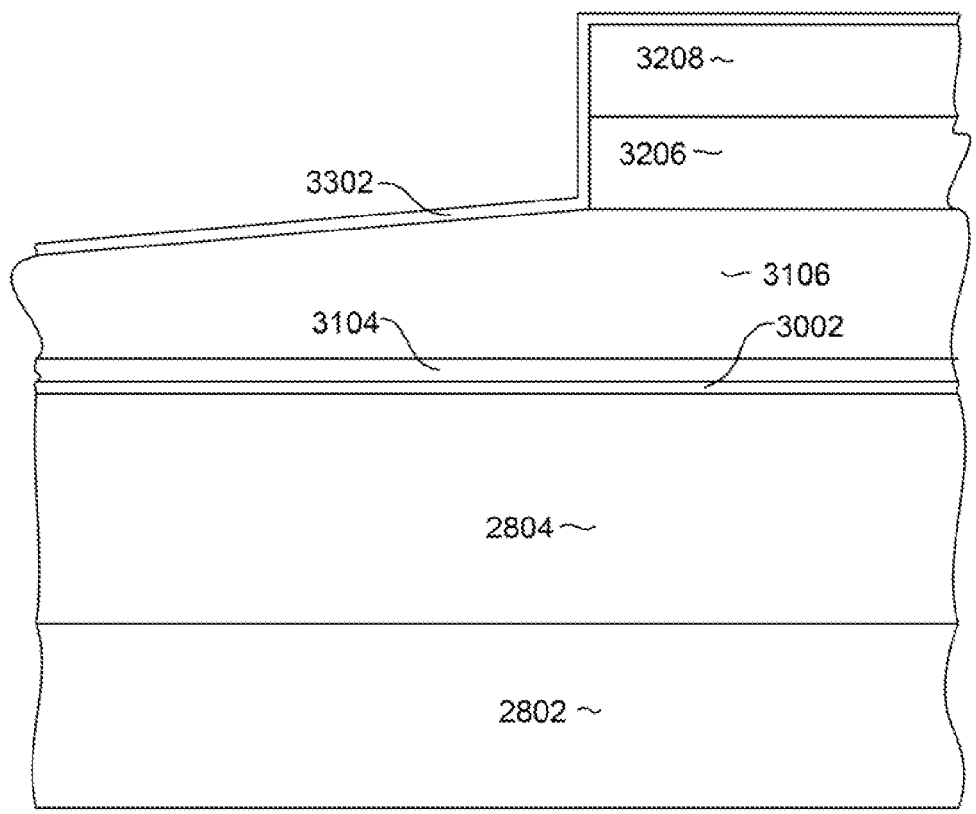

A non-magnetic trailing gap material 3302 is then deposited, resulting in a structure such as that shown in FIG. 33. The trailing gap layer can be constructed of Ru or alumina and is deposited to a thickness that is chosen to define a desired write tap thickness.

Figure 34:
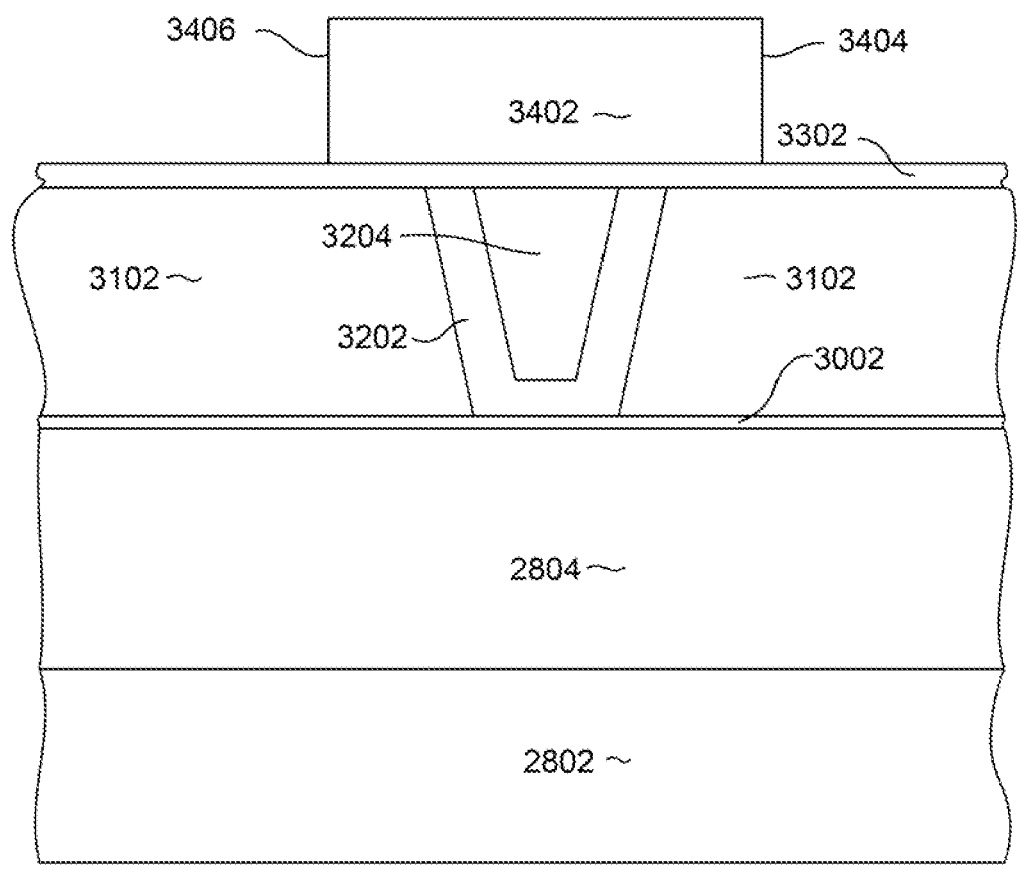
Figure 35:
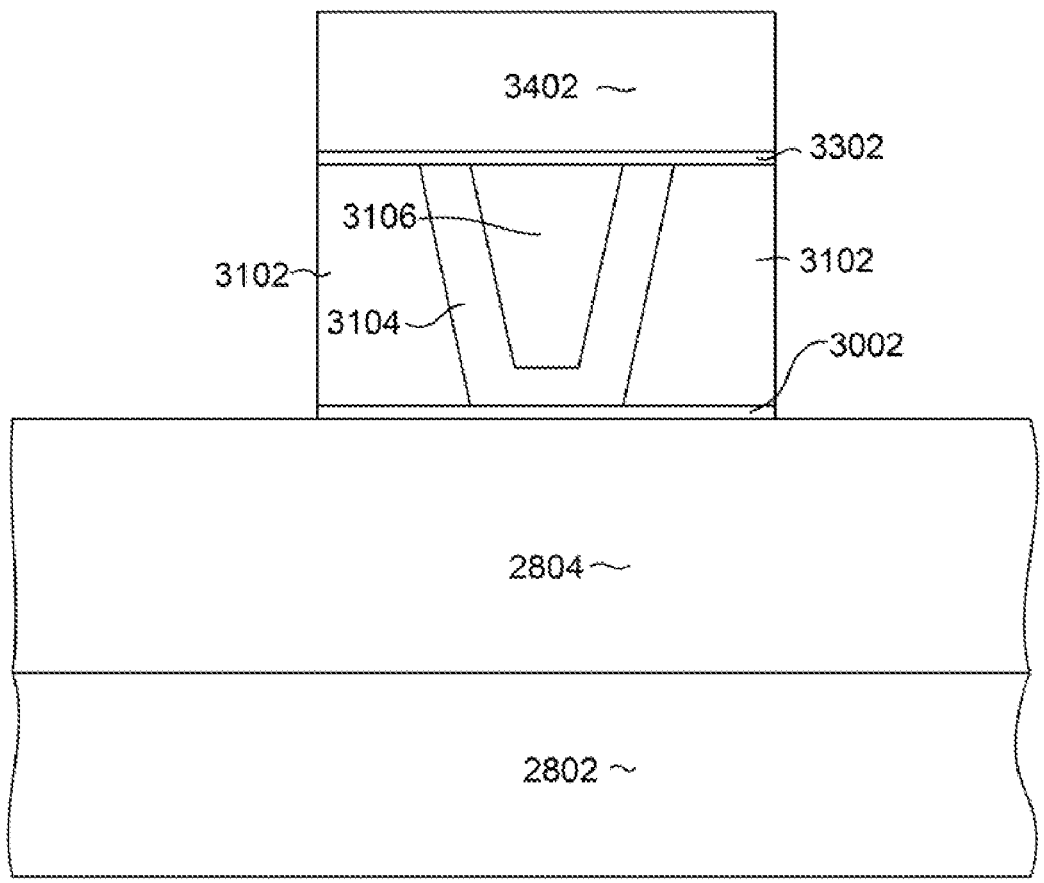
Figure 36:
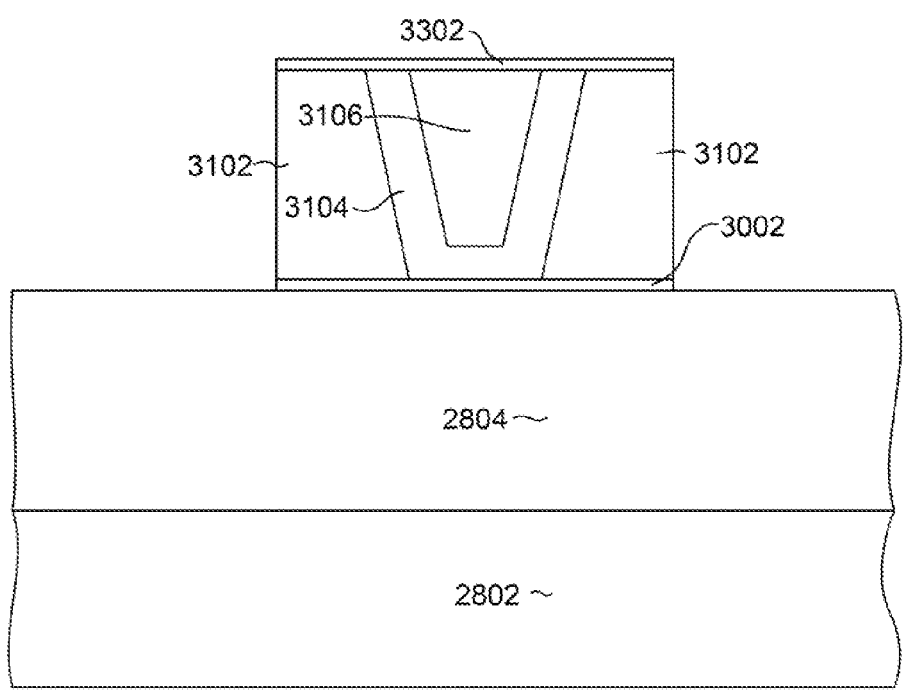

FIG. 34 shows a cross sectional view of the ABS plane, which is indicated by line ABS in FIG. 33. With reference then to FIG. 34, a mask layer 3402 is formed over the write pole 3204 and write gap layer 3302. This mask 3402 has sides 3404, 3406 that are configured to define a side gap width as will be apparent below. Then, a combination of material removal processes are performed to remove portions of the layers 3302, 3102 and 3002 that are not protected by the mask 3402, leaving a structure as shown in FIG. 35. The material removal processes used to form the structure of FIG. 35 include a first ion milling to remove the trailing gap layer 3302. This is followed by a reactive ion etching to remove the RIEable fill layer 3102. This reactive ion etching is performed until RIE stop layer has been reached. A second ion milling is then performed to remove the RIE stop layer 3002. The mask 3402 can then be lifted or otherwise removed, leaving a structure such as that shown in FIG. 36.

Figure 37:
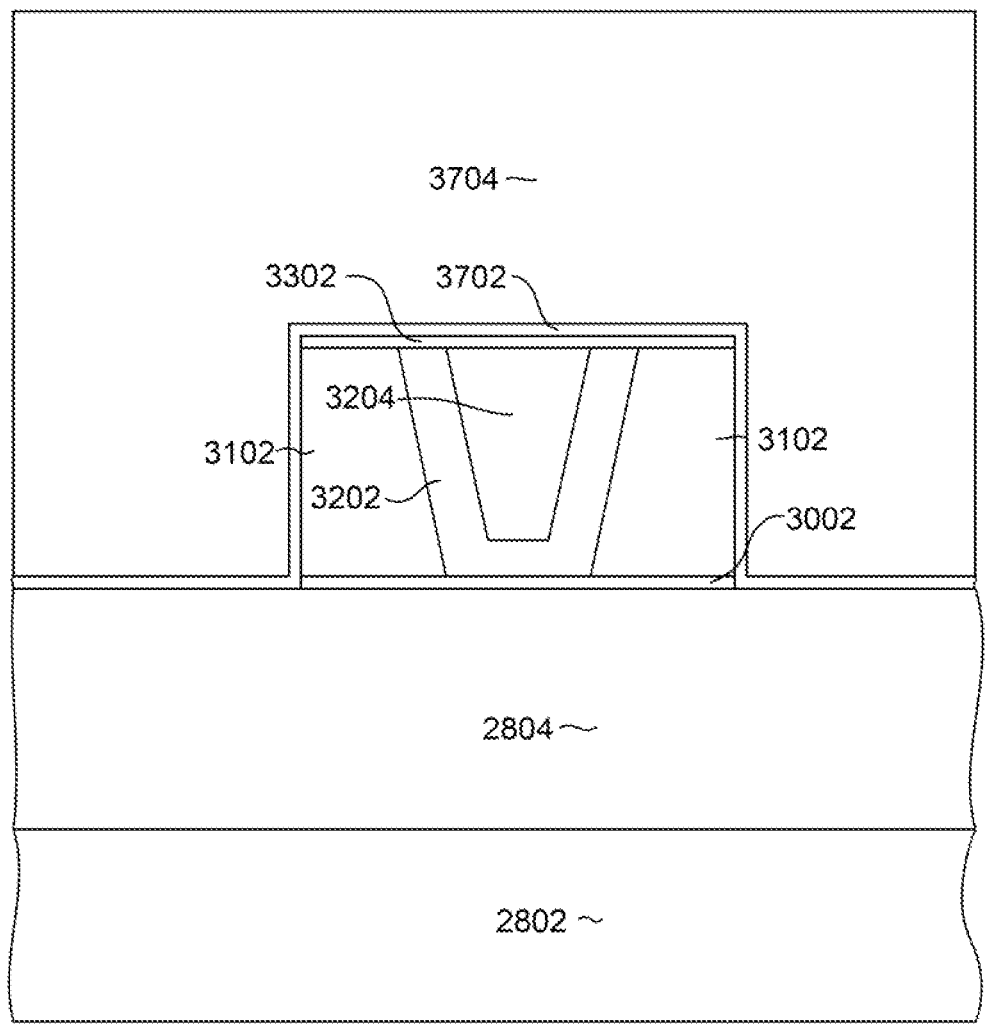
FIGS. 37-47 are views of a write head in various intermediate stages of manufacture, illustrating a method of manufacturing a write head according to yet another embodiment of the invention.

Then, with reference to FIG. 37 a magnetic shield can be formed by first depositing a magnetic seed layer 3702, then forming an electroplating frame mask (not shown in FIG. 37) and then electroplating a magnetic material 3704. The magnetic seed layer 3702 can be a high Bsat material such as CoFe in order to improve the performance of the trailing shield 3704. As can be seen, this results in the trailing shield 3704 being magnetically and physically connected with the leading shield 2804.

Figure 38:
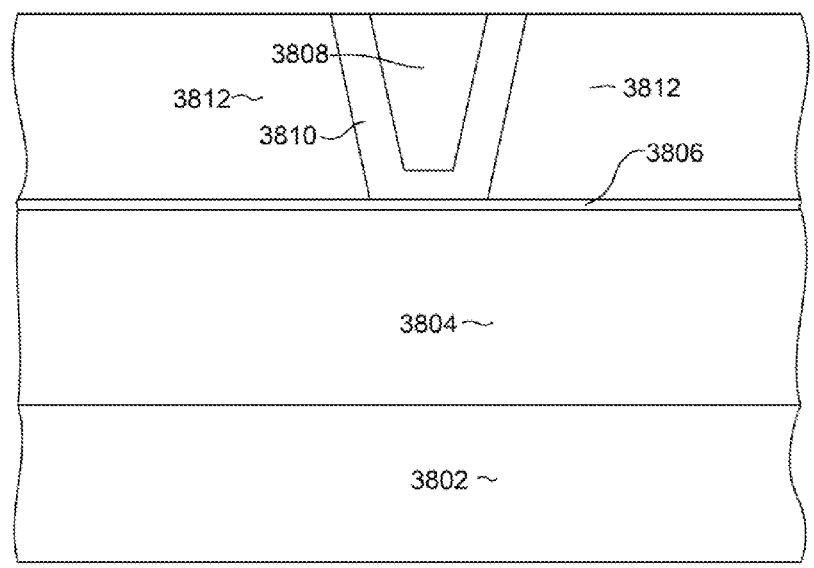

FIGS. 38 through 47 illustrate still another method for manufacturing a magnetic write head according to an embodiment of the invention. With particular reference to FIG. 38, a write pole 3808 is formed over a magnetic leading shield 3804 and an underlying substrate 3802. The write head 3808 can be constructed by a damascene process as describe previously above, and has a non-magnetic layer such as Ru 3808 covering the sides and leading edge of the write pole and a non-magnetic RIEable fill layer 3812 at either side thereof.

Figure 39:
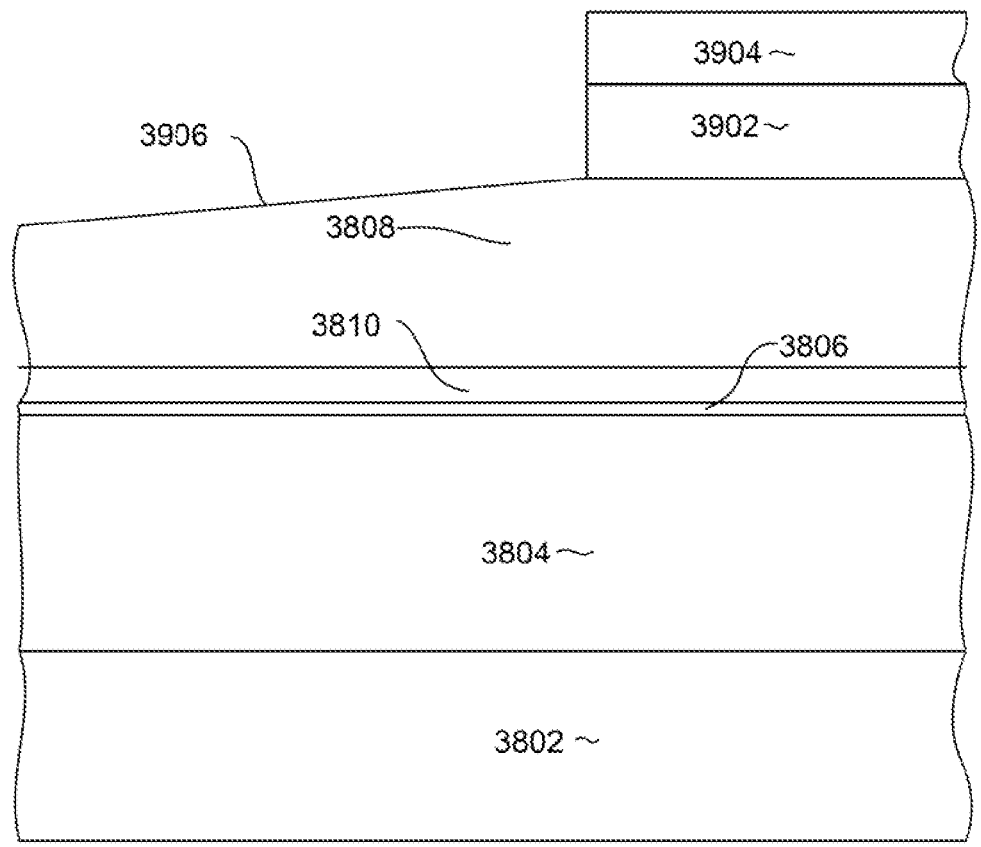

FIG. 39 shows a cross-sectional view as seen from line 39-39 of FIG. 38. As shown in FIG. 39 a non-magnetic step layer 3902 and mask layer 3904 are formed over a portion of the write pole as described previously above. An ion milling is then performed to form a tapered trailing edge portion 3906 as described previously.

Figure 40:
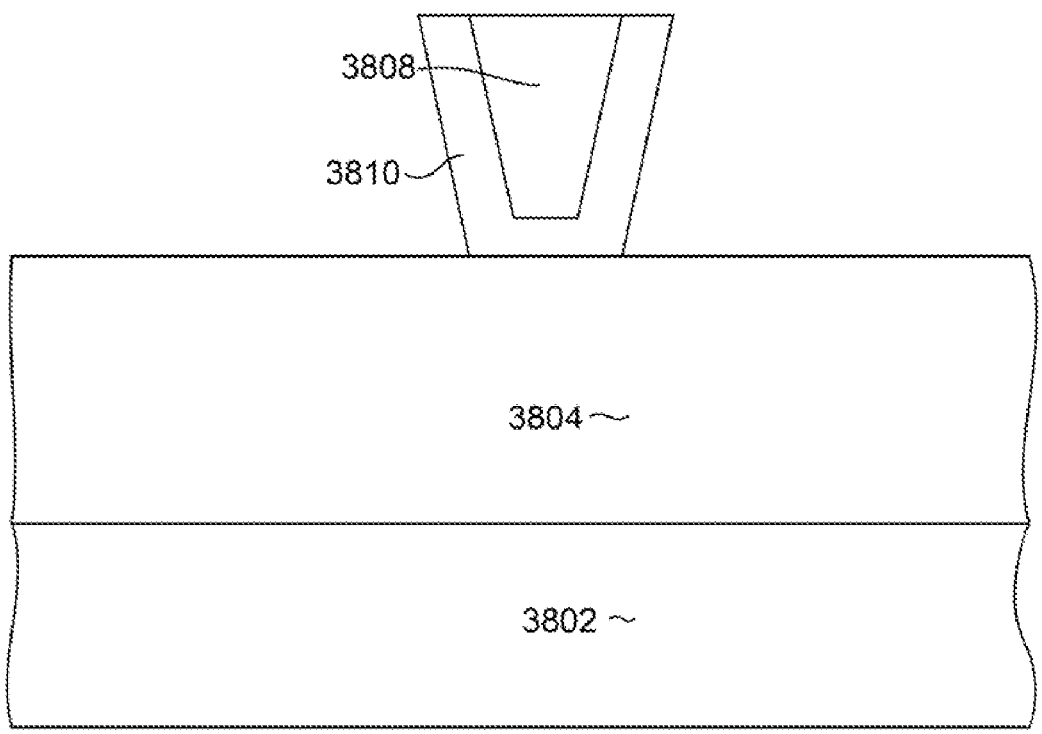
Figure 41:
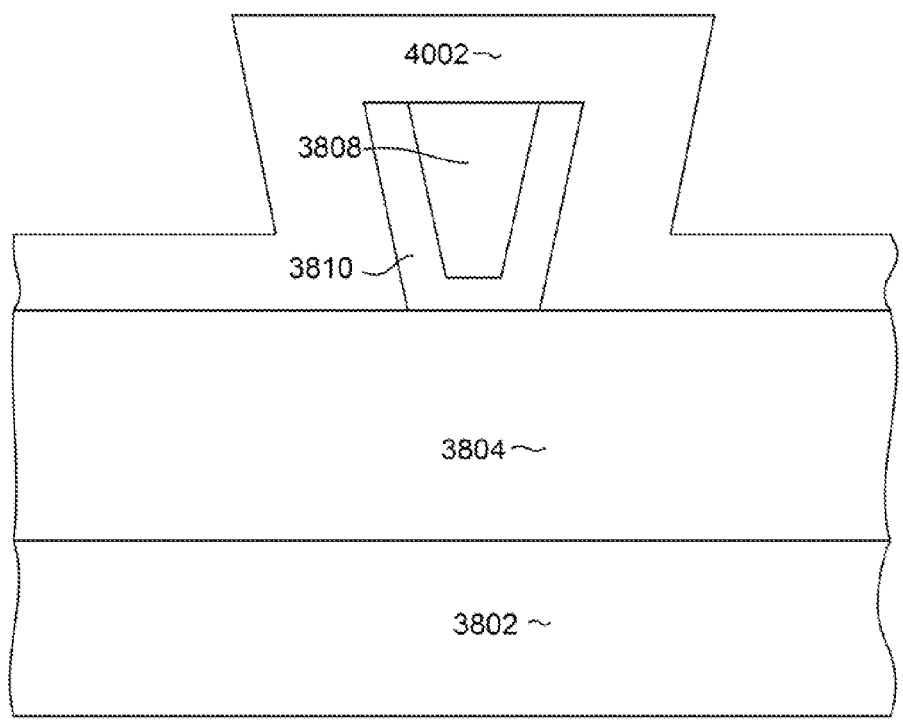
Figure 42:
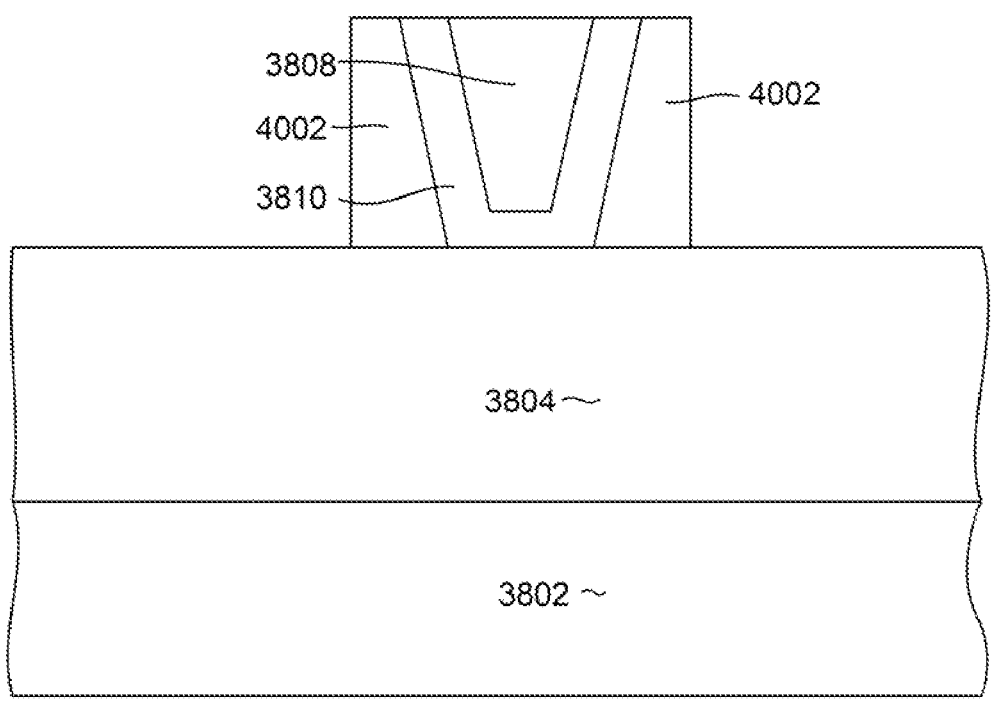

Then, a reactive ion etching is performed to remove the non-magnetic fill layer 3812 described earlier with reference to FIG. 38, leaving a structure as shown at the ABS plane in FIG. 40. In FIG. 40 the non-magnetic step 3902 and mask 3904 (FIG. 39) are not shown, because they are into the plane of the page. Then, as shown in FIG. 41, a thick layer of non-magnetic material, preferably alumina 4002 is deposited by a conformal deposition process such as atomic layer deposition (ALD). An ion milling is then performed to preferentially remove horizontally disposed portions of the alumina layer 4002, leaving alumina side walls 4002 as shown in FIG. 42 and leaving an alumina bump at the front of the non-magnetic step layer 3902 (FIG. 39 as described above in the previously described embodiments).

Figure 43:
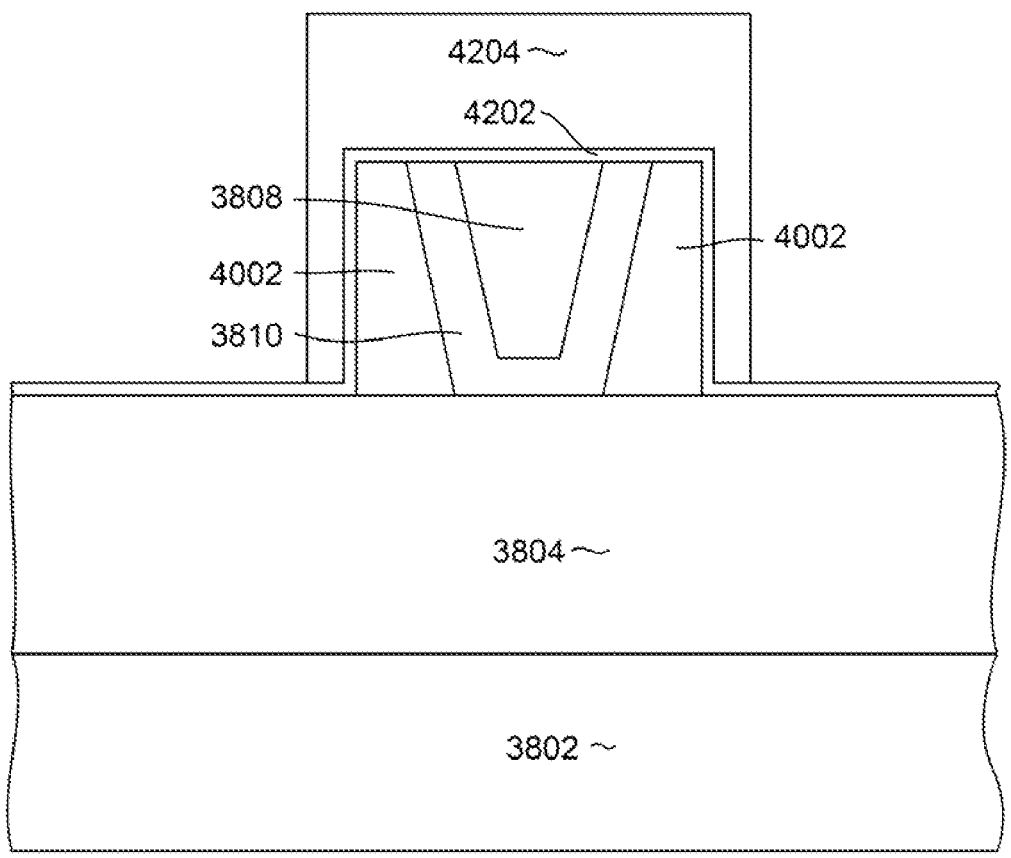

Then, with reference to FIG. 43, a non-magnetic trailing gap layer 4202 is deposited. The non-magnetic trailing gap layer 4202 is deposited to a thickness to define a desired trailing gap thickness. Then, a mask 4204 is formed over the write pole 3808, non-magnetic layer 4002 and non-magnetic side walls 4002. The mask 4204 leaves a portion over the leading shield 3804 uncovered.

Figure 44:
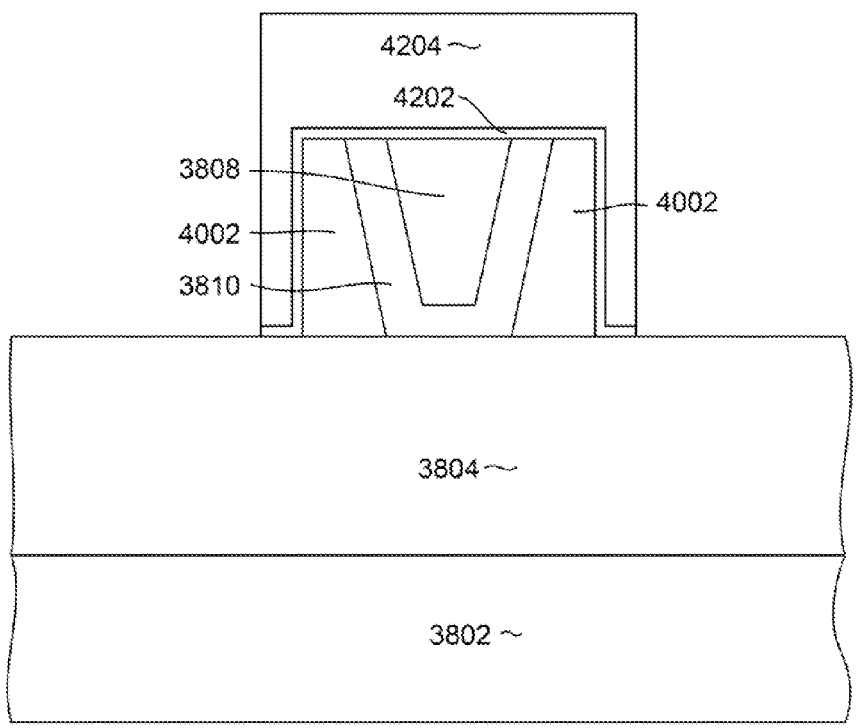
Figure 45:
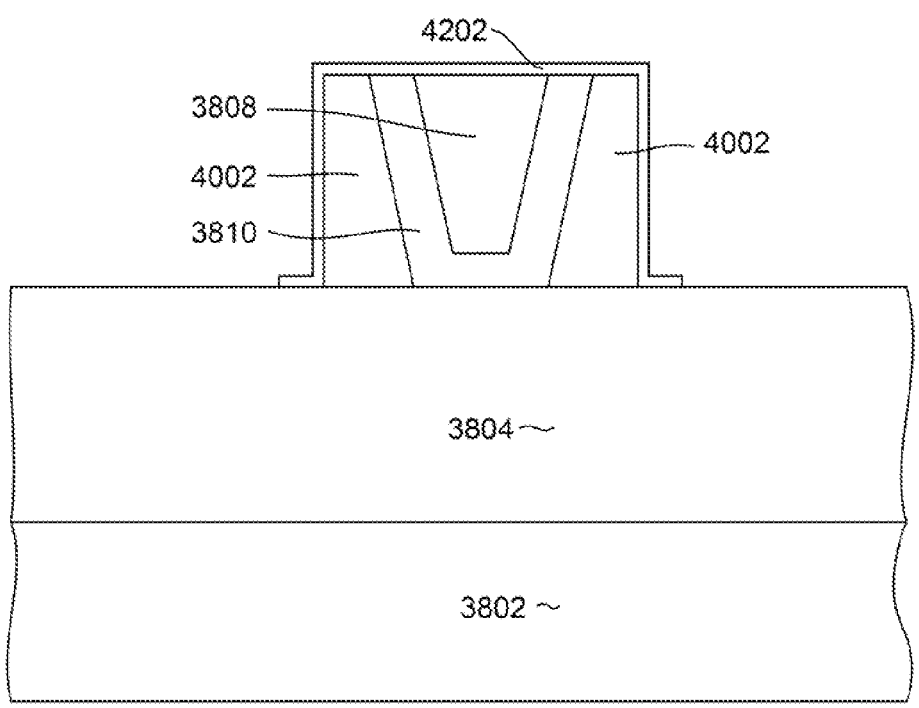

Then, an ion milling is performed to remove portions of the non-magnetic gap layer 4202 that are not protected by the mask 4204, leaving a structure as shown in FIG. 44, with a portion of the leading shield 3804 uncovered. The mask 4204 can then be removed, leaving a structure as shown in FIG. 45.

Figure 46:
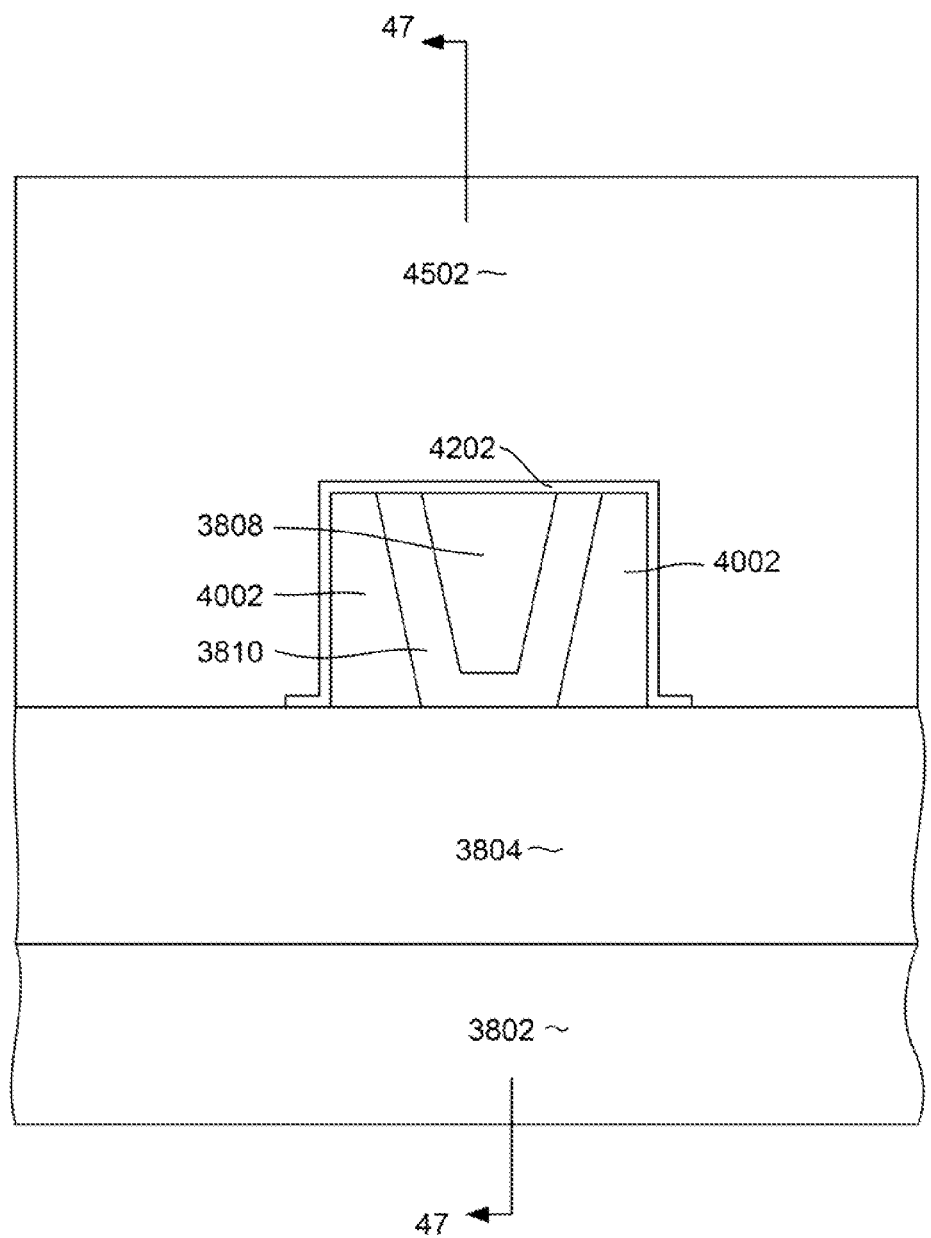
Figure 47:
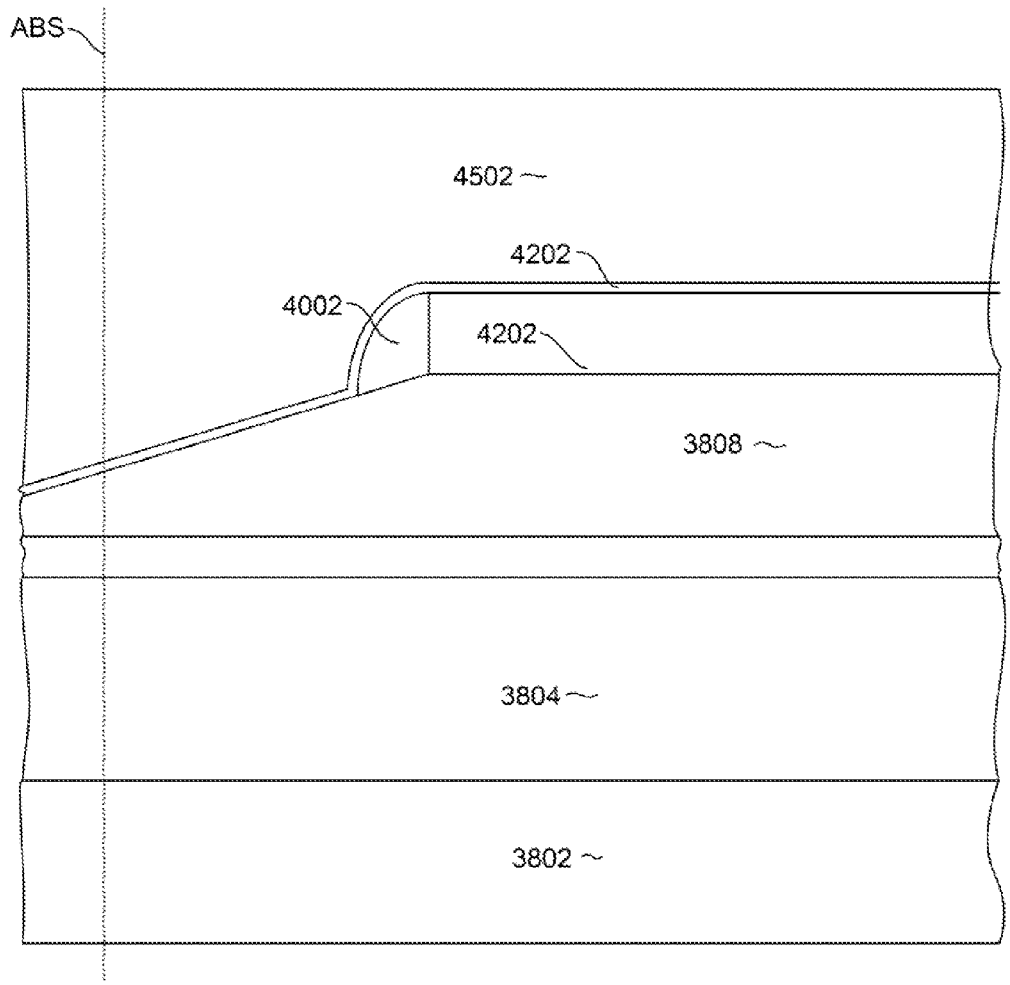

Then, with reference to FIGS. 46 and 47, a trailing magnetic shield 4502 can be formed over the write pole 3808, trailing gap layer 402, layers 3810, 4002 and leading magnetic shield 3802. The trailing shield 4502 can be formed by electroplating as discussed earlier above. As can be seen, this allows the trailing shield 4502 to be connected with the leading magnetic shield 3804, thereby preventing the formation of singular points at the bottom inner corners of the trailing magnetic shield. As described above, the formation of such singular points at the inner corners of the trailing shield would adversely affect write head performance by attracting write field from the leading edge of the write pole 3808. Also as can be seen in FIG. 47, the write head has a non-magnetic step layer 4202 and a non-magnetic bump 4002 formed at the front edge of the non-magnetic step layer 4202, both of which provide advantageous separation of the trailing shield 4502 from the write pole 3808 at a region removed from the ABS.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   forming a leading magnetic shield on the substrate;
   depositing a RIEable fill layer over the leading magnetic shield;
   forming a trench in the RIEable fill layer;
   depositing a non-magnetic track width reducing layer into the trench in the RIEable fill layer;
   electroplating a magnetic material over the non-magnetic track width reducing layer and into the trench to form a magnetic write pole;
   forming a non-magnetic step layer over a portion of the write pole, the non-magnetic step layer having a front edge that is recessed from an air bearing surface plane;
   performing a first ion milling to form a first tapered trailing edge surface portion on the write pole;
   performing a reactive ion etching to remove the RIEable fill layer;
   depositing a layer of alumina over the write pole and the non-magnetic step layer;
   performing a second ion milling to preferentially remove horizontally disposed portions of the alumina layer, thereby forming a non-magnetic bump on the front edge of the non-magnetic step layer and over the first tapered trailing edge surface portion;
   performing a third ion milling to form a second tapered trailing edge surface portion extending from the non-magnetic bump layer to the air bearing surface plane;
   depositing a non-magnetic trailing gap layer; and
   forming a magnetic trailing shield over the write pole, the magnetic trailing shield contacting the exposed portion of the leading magnetic shield.

2. The method as in claim 1 wherein the RIEable fill layer comprises $SiO_2$.

3. The method as in claim 1 wherein the RIEable fill layer comprises alumina.

4. The method as in claim 1 wherein the non-magnetic trailing gap layer has a thickness of 10-30 nm.

5. The method as in claim 1 wherein the layer of alumina is deposited by atomic layer deposition.

6. The method as in claim 1 wherein the non-magnetic track width reducing layer has a thickness that is at least twice as thick as the non-magnetic trailing gap layer.

7. The method as in claim 1 wherein the non-magnetic track width reducing layer has a thickness that is about 4 times as thick as the trailing gap layer.

8. The method as in claim 1 wherein the second ion milling leaves a portion of the layer of alumina on the sides of the write pole and remaining track width reducing layer, thereby forming alumina side walls.

9. The method as in claim 1 wherein the first and second tapered portions of the write pole each define an angle of 20 to 40 degrees relative to a plane of the deposited RIEable fill layer.

* * * * *